US010796607B2

(12) United States Patent
Wen et al.

(10) Patent No.: US 10,796,607 B2
(45) Date of Patent: Oct. 6, 2020

(54) DYNAMIC PHANTOM

(71) Applicant: Inwentech, Glen Waverley, Victoria (AU)

(72) Inventors: Chuan-Dong Wen, Glen Waverley (AU); Benjamin Hill, Cremorne (AU); Chau H. T. Nguyen, Cremorne (AU); Helena S. Wen, Glen Waverley (AU)

(73) Assignee: Inwentech, Glen Waverley, Victoria (AU)

( * ) Notice: Subject to any disclaimer, the term of this patent is extended or adjusted under 35 U.S.C. 154(b) by 343 days.

(21) Appl. No.: 15/304,954

(22) PCT Filed: Apr. 22, 2015

(86) PCT No.: PCT/AU2015/000239
§ 371 (c)(1),
(2) Date: Oct. 18, 2016

(87) PCT Pub. No.: WO2015/161337
PCT Pub. Date: Oct. 29, 2015

(65) Prior Publication Data
US 2017/0169734 A1 Jun. 15, 2017

(30) Foreign Application Priority Data

Apr. 22, 2014 (AU) .............................. 2014901456

(51) Int. Cl.
*G09B 23/32* (2006.01)
*G09B 23/34* (2006.01)
(52) U.S. Cl.
CPC ............. *G09B 23/32* (2013.01); *G09B 23/34* (2013.01)
(58) Field of Classification Search
CPC .................................. G09B 23/32; G09B 23/34
(Continued)

(56) References Cited

U.S. PATENT DOCUMENTS 7,402,819 B2 7/2008 Saracen
8,535,061 B2 9/2013 Boutchko et al.
(Continued)

FOREIGN PATENT DOCUMENTS

WO WO-2015089512 A1 * 6/2015

OTHER PUBLICATIONS

Steidl, P. et al., "A breathing thorax phantom with independently programmable 6D tumour motion for dosimetric measurements in radiation therapy", Physics in Medicine and Biology, Mar. 29, 2012, pp. 2235-2250, Phys. Med. Biol. 57, IOP Publishing, Bristol, United Kingdom.
(Continued)

*Primary Examiner* — Robert P Bullington
(74) *Attorney, Agent, or Firm* — Michael Best & Friedrich LLP

(57) ABSTRACT

Described is a dynamic phantom. The phantom comprises a body having a front, a back, and an internal cavity between the front and the back, the body having a movable chest wall. The phantom also comprises a first motion mechanism that is actuated to move the chest wall to thereby move the front relative to the back of the body. The phantom also comprises a moveable organ member supported within the internal cavity that is caused to move relative to the body by a second motion mechanism. The phantom also comprises a drive source for driving the first and second motion mechanisms, wherein the first and second motion mechanisms move the chest wall and the moveable organ member to substantially represent their movement in a human body.

16 Claims, 22 Drawing Sheets

(58) Field of Classification Search
    USPC ........................................................ 434/267
    See application file for complete search history.

(56) References Cited

U.S. PATENT DOCUMENTS

| 2007/0140413 | A1* | 6/2007 | Saracen | A61B 6/08 |
| | | | | 378/18 |
| 2008/0298540 | A1 | 12/2008 | Serban et al. | |
| 2009/0110140 | A1* | 4/2009 | Krautim | A61N 5/1048 |
| | | | | 378/18 |
| 2016/0314718 | A1* | 10/2016 | Bergs | G09B 23/30 |

OTHER PUBLICATIONS

International Preliminary Report on Patentability for PCT Application No. PCT/AU2015/000239 dated Apr. 27, 2016 (12 pages).
International Search Report and Written Opinion for PCT Application No. PCT/AU2015/000239 dated Jul. 27, 2015 (8 pages).

* cited by examiner

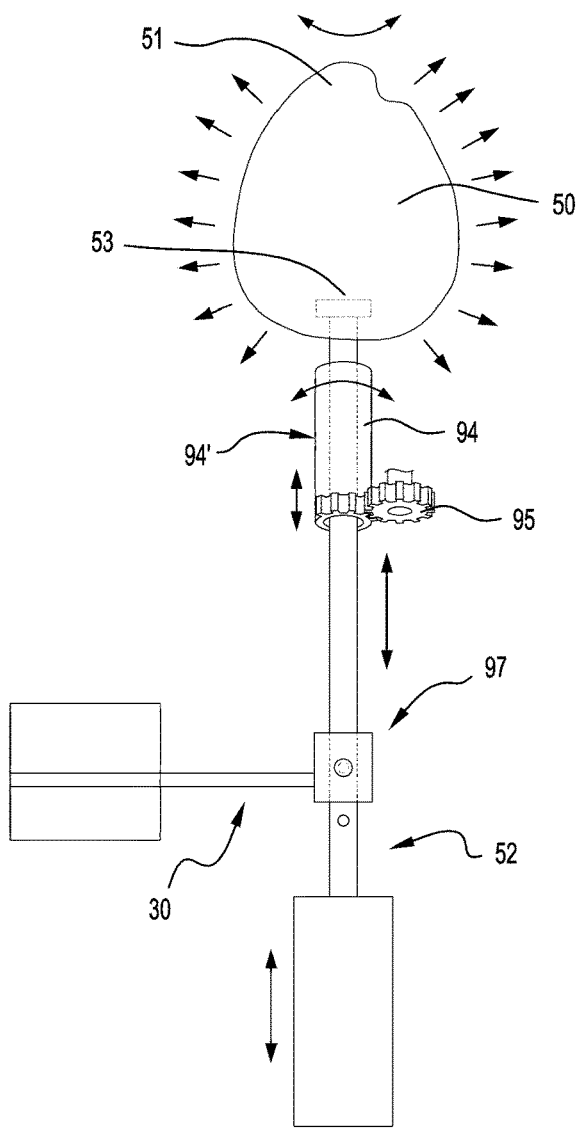
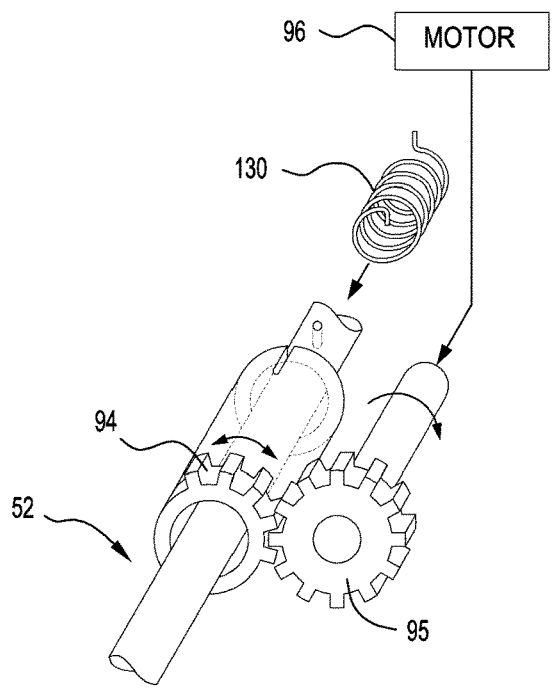
Figure 6c
Figure 6b
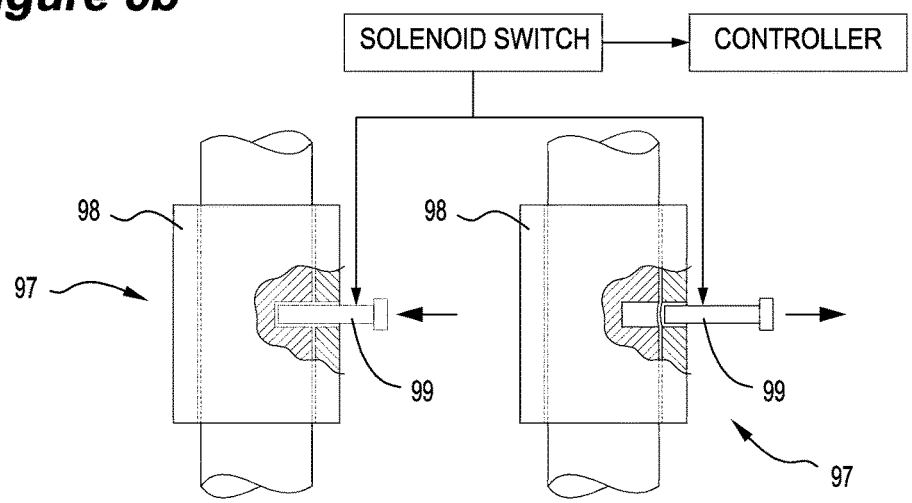
Figure 6d

DYNAMIC PHANTOM

FIELD OF THE INVENTION

The present invention relates to a dynamic phantom. Dynamic phantoms are used in medical applications such as image-guided radiation therapy to, for example, plan, deliver and measure the radiation dose delivered by a radiation source.

BACKGROUND

Treatment of cancer through the use of radiation therapy entails exposing a cancer lesion to a radiation beam delivered by a radiation source, such as a medical linear accelerator (LINAC). The radiation source delivers a beam of radiation aimed at the cancer lesion. As the cancer lesion is often below the skin, for example in breast and lung cancers, the beam of radiation passes through any tissue between the radiation source and the cancer lesion, and through any tissue on the other side beyond the cancer lesion. Healthy tissue exposed to radiation can become damaged in the process, however this damage is considered acceptable to a certain extent as it is the consequence of, and out-weighted by, treating the cancer, which is a greater hazard/life threatening. As it is not desirable to damage healthy tissue, techniques are developed to avoid as much healthy tissue as possible, with new treatment methods helping reduce the amount of exposure to healthy tissue while maintaining the same exposure to the cancer lesion.

By delivering radiation a beam of smaller size and more conformal to the shape of the cancer lesion the radiation dose can be delivered with the accuracy of a surgeon, reducing the amount of healthy tissue that would otherwise be irradiated. Stereotactic body radiotherapy (SBRT), or stereotactic ablative radiotherapy (SART), is a radiotherapy technique for cancers in thorax and abdomen that delivers a larger dose of radiation, often 4 to 9 times greater than standard radiotherapy techniques, but in fewer repetitive delivery fractions. The internal respiratory, cardiac and intestinal movements affect cancers located in thoracic and abdominal regions. As a result, precisely determining the position of the cancerous volume surrounded by healthy tissue, and directing the radiation beam towards cancerous tissue, is vital. The ability of the radiation therapy professional to accurately direct the radiation beam is in high demand.

When treating breast cancer in the left breast, the heart, lung tissue between the heart and breast and other near-by healthy tissue, may be exposed to the radiation beam at some angles of treatment. This unwanted exposure can lead to radiation toxicity or later side effects to the heart in particular, affecting the long term treatment outcome of younger patients. Consequently, a new method of treating breast cancer with radiation therapy has been developed in which the patient only receives treatment when they have taken in and voluntarily hold a breath. This is beneficial as the heart moves inferior (down) and away from the radiation beam during inhalation period, distancing the heart from the left breast. In this technique, called deep inhalation breath-hold (DIBH), radiation is delivered to the target tumour only when the patient's lungs are inflated. This requires the radiation beam to be turned on and off (gated), and the position of the cancer to be tracked, during the breathing-then-hold process. This technique a) increases the distance between the target (breast volume) and the heart; b) avoids or reduces the near-by heart volume being irradiated, and hence reduces the possibility of side effects of irradiation; c) reduces the percentage of irradiated lung volume underneath the target breast (the lungs expand during inhalation so the beam exposes less total lung volume than when the lung is not expanded).

In the free breathing technique the patients breathe freely, with their chest and the target cancer moving during inspiration and expiration. In order for this technique to function the patient is monitored while breathing freely so that the position to the cancer can be determined as a function of the breathing cycle. This is called free breathing gated delivery that allows the radiation to be directed to the precise position of the cancer and only delivered when the patient is at a pre-determined position in the breathing cycle. Often an infrared (IR) or optical camera is used during the initial simulation and this data is analysed with respected to the cancer position as a function of the breathing cycle data. The IR camera is again used during treatment in order to determine the position of the cancer. The patient will be treated multiple times on an accelerator equipped with same or similar monitor system and the patient is required to reproduce and maintain the same breathing patterns as those of the initial simulation.

DIBH, on the other hand, relies on the patient to take in a deep breath and hold the breath for approximately 20-30 seconds or longer. During DIBH the chest expands and the heart moves inferior significantly more than during the free breathing period, making DIBH of greater benefit for achieving bigger separation between the chest wall and the heart. A similar IR camera can be used in DIBH as described for the free breathing technique.

Since these techniques are relatively new, and have not been implemented in most radiotherapy facilities across the world, a new trend of clinical implementation is on the rise. To assist the commissioning of radiation delivery equipment and routine quality assurance (QA) in clinical practice, methods and apparatus capable of testing these techniques are required to implement these techniques, to train operators and to ensure radiation delivery machines set up to carry out these techniques are functioning properly.

SUMMARY OF THE INVENTION

The invention provides a dynamic phantom, the phantom comprising; a body having a front, a back, and an internal cavity between the front and the back, the body having a movable chest wall; a first motion mechanism that is actuated to move the chest wall to thereby move the front relative to the back of the body; a moveable organ member supported within the internal cavity that is caused to move relative to the body by a second motion mechanism; and drive source for driving the first and second motion mechanisms; wherein the first and second motion mechanisms move the chest wall and the moveable organ member to substantially represent their movement in a human body.

In some embodiments the chest wall comprises a first segment and a second segment, wherein the first segment and the second segment move relative to each other when the first motion mechanism moves the chest wall. The chest wall may further comprise a third segment located between the first section and the second section. The third segment of the chest wall may be elastic.

In further embodiments the chest wall is resilient and deforms when the first motion mechanism moves the chest wall. The chest wall may be rigidly attached to the back. In addition, the chest wall may be biased towards an exhalation position, with the first motion mechanism moving the chest wall to an inhalation position.

In other embodiments the first motion mechanism is attached to the chest wall at a plurality of points. The first motion mechanism may be attached to the first and second sections of the chest wall at a plurality of points. The first motion mechanism may move linearly in a direction from the back to the front of the body. The first motion mechanism may expand the chest wall.

In some embodiments the moveable organ member is deformable. A first end of the moveable organ member may be fixed relative to the back. A second end of the moveable organ member may be biased towards a first position and the second motion mechanism may stretch the moveable organ member to move the second end of the moveable organ member relative to the first end of the moveable organ member. The moveable organ member may be a heart. The moveable organ member may be a pair of lungs. If the moveable organ member is a pair of lungs, the pair of lungs may be in fluid communication with a ventilator.

In some embodiments of the dynamic phantom the chest wall moves in more than one spatial direction.

In further embodiments the first motion mechanism is an electromechanical mechanism. The first or second motion mechanism may comprise a linkage arrangement. In a preferred embodiment the first or second motion mechanisms may comprise reciprocating, pivoting, cammed or sliding movements.

In some embodiments the chest wall comprises a first segment, a second segment and a third segment, the third segment connecting the first segment to the second segment. The first motion mechanism may be connected to the third segment. The first motion mechanism may comprise an arm pivotally connected to both the third segment and the back of the phantom. The first motion mechanism further may comprise a reciprocating shaft, the reciprocating shaft being pivotally connected to the arm. In a more preferred embodiment the reciprocating shaft is connected to the arm via a connecting member. In some embodiments, when the reciprocating shaft is extended the arm pivots relative to the back of the phantom to move the chest wall away from the back of the phantom.

In other embodiments the third segment is flexibly connected to the first segment and the second segment.

In some embodiments the first segment and the second segment are connected to the back of the phantom.

In some embodiments each of the first and second motion mechanisms substantially represent the movement of both inhalation and exhalation in a human body.

In some embodiments the first and second motion mechanisms are synchronised.

DESCRIPTION OF THE DRAWINGS

An embodiment, incorporating all aspects of the invention, will now be described by way of example only with reference to the accompanying drawings in which:

FIG. 6B is a schematic of the movable organ member in FIG. 6A with an addition motion mechanism;

FIG. 6C is a schematic of the addition motion mechanism in FIG. 6B;

FIG. 6D is a schematic of the coupling in FIG. 6B;

FIG. 22b is an isometric cross-sectional view of the connector in FIG. 22a;

DESCRIPTION OF THE PREFERRED EMBODIMENTS

Figure 1:
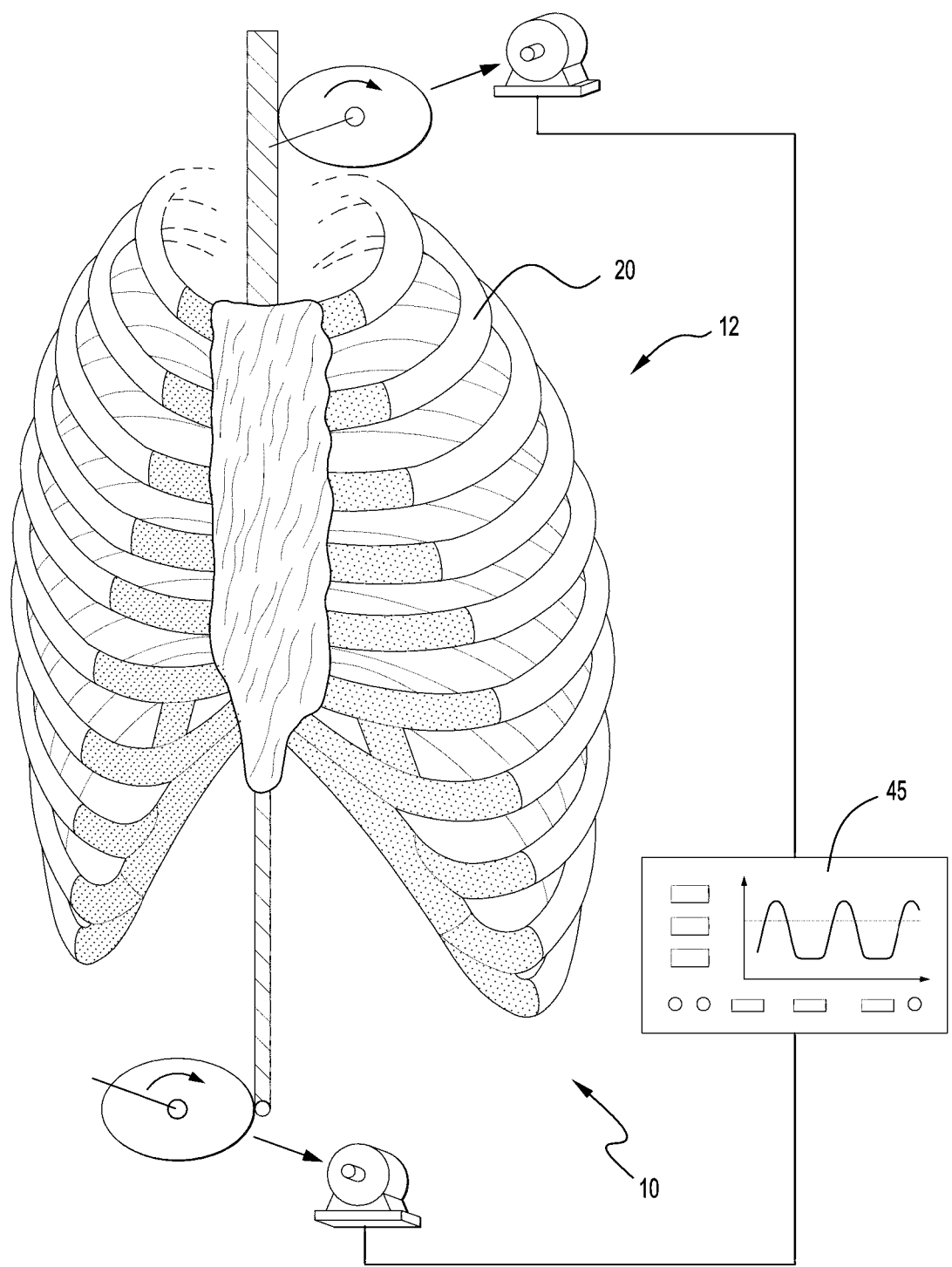
FIG. 1 is a front isometric view of a phantom in accordance with an embodiment of the present invention.

FIGS. 1 to 4 illustrate a dynamic phantom 10 that comprises a body 12 having a front 14, a back 16, and an internal cavity 18 between the front 14 and the back 16 of the body 12. The body has a movable chest wall 20, at the front 14 of the body 12, that is moved by a first motion mechanism, for example driving member 30 connected to driving means 32, thereby moving the front 14 of the body 12 relative to the back 16 of the body 12. The movement of the movable chest wall 20 is designed to represent the movement of the chest as it expands and contracts during respiration.

It should be noted that throughout the description of the preferred embodiments terms such as chest, heart, lung, spine, breast etc. are used to denote features that resemble these body parts, e.g. anthropomorphic. For example the use of the term heart is not intended to describe an actual human heart, either living or previously living, but rather an object resembling the heart. It will be understood that while human organs could be used for some of the body parts, for example the ribs, it may be more practical to use other objects with similar physical and chemical properties of the corresponding human parts in their place. The physical and chemical properties may include material density and electron density, mechanical strength, deformability, colour and tolerance to radiation damage. If the term is intended to be an actual human body part it will be preceded by the term 'human', e.g. human heart.

The first motion mechanism is capable of representing the movement of the human chest during respiration, and allows for techniques that rely on treatment during respiration, or under deep inhalation, to be assessed in vitro. The two main breathing regimes that are considered are free breathing, where a patient breathes normally, and deep inhalation breathing, where a patient inhales to near maximum lung capacity and holds their breath for as long as they can stably do so before exhaling and repeating the process. The first motion mechanism is designed to move the chest wall in order to simulate, or approximate, the movement of the chest wall in both free breathing and deep inhalation breathing regimes.

The chest wall may be formed in a variety of different ways, with each variation offering different advantages. For example, the chest wall 20 could be represented by a flat rigid plate, or represented as a human rib cage. While a flat rigid plate would replicate the overall movement of the chest wall 20, it would not replicate the deformation of chest that occurs during respiration. On the other hand, while a human rib cage would accurately replicate the deformation of a human chest wall, using a human rib cage is much more complicated and expensive. Ultimately, the chest wall will preferably act like a rib cage and be capable of stimulating the breathing motions of both free breathing and deep inhalation breathing, both temporally and spatially.

Figure 2:
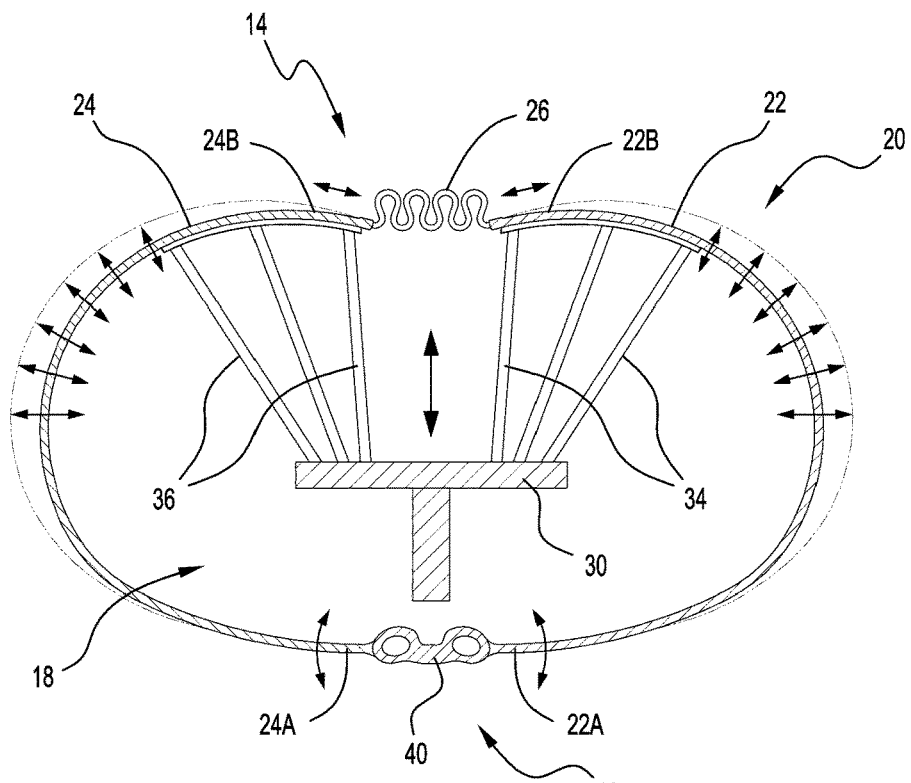
FIG. 2 is a schematic of a phantom in accordance with another embodiment of the present invention.
Figure 12:
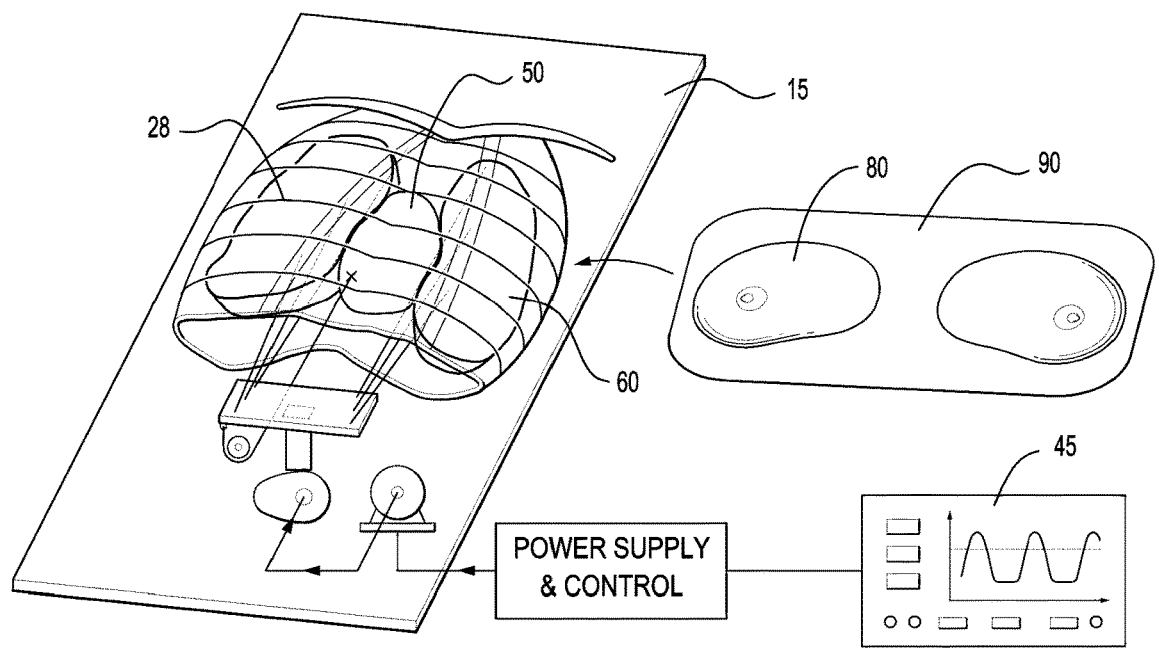
FIG. 12 is a schematic of a phantom in accordance with another embodiment of the present invention.

FIG. 2 illustrates a cross-sectional view of the body 12 with the chest wall 20 comprising a first segment 22 and a second segment 24. Both of the first segment 22 and the second segment 24 are connected to a support, for example a spine 40, at the back 16 of the body 12. It will be understood that the support at the back 16 of the body 12 could be any support, for example a base plate for any other mounting structure. FIG. 12 illustrates the support as base plate 15.

A first end 22A of the first segment 22 is connected to the spine 40, and a first end 24A of the second segment 24 is connected to the spine 40. The first end 22A of the first segment 22 and the first end 24A of the second segment 24 may be connected to the spine 40 by any means. For example, the first ends 22A, 24A could be rigidly connected to the spine 40, pivotally connected to the spine 40, or elastically connected to the spine 40. Alternatively, the first segment 22 and the second segment 24 could form one piece, with a spine 40 in-between the first segment 22 and the second segment 24.

Splitting the chest wall into two segments allows the chest wall to expand without having to be elastic. This aids in replicating the movement of a human chest wall, which is made up of from ribs connected to a spine, the ribs being connected to the breastbone and the sternum which is elastic in nature at the front of the chest. It will be understood that the first segment 22 and the second segment 24 do not need to be connected to each other, however, they may be either directly or indirectly connected to each other. It is also understood that the first segment 22 and the second segment 24 could be represented by the left and right set of ribs. Alternatively, a human rib cage could be used in the phantom 10.

The chest wall 20 may further comprise a third segment 26 between the first segment 22 and the second segment 24. The third segment 26 may be elastic in order to replicate the human sternum. For example, the third segment 26 could be formed from a material exhibiting elastic qualities, such as rubber or silicone, or it could be an elastic object, such as a spring. FIG. 2 illustrates a second end 22B of the first segment 22 being connected to the third segment 26, and a second end 24B of the second segment 24 also being connected to the third segment 26. An elastic third segment acts to pull the second end 22B of the first segment 22 and the second end 24B of the second segment 24 together. While the chest wall 20 may be of any desired size, the dimensions of the chest wall 20 preferably represent the dimensions of the human group being considered (e.g. the average male, the average female, the average child of a particular age, or a specific individual).

In operation the driving member 30 is actuated to move the chest wall 20. A drive source, such as a software interface on a computer 45 controlled by a user, drives the first motion mechanism. In the example of the chest wall 20 being represented by flat plate the motion mechanism may only be connected to the chest wall 20 at a single point (not shown). However, the driving member 30 may be connected at more than one point of the chest wall 20. As illustrated in FIG. 2, the driving member 30 is connected to the first segment 22 and the second segment 24 of the chest wall 20 by a first set of connecting members 34 and a second set of connecting members 36. The third segment 26 is elastic and the first and second segments 22, 24 are resilient. As the driving member 30 is actuated the connecting members 34, 36 act on the chest wall 20 to expand the chest wall 20 and elongate the third segment 26, thereby moving the first segment 22 and the second segment 24 relative to each other. This movement, wherein the chest wall moves in more than one spatial direction, replicates inhalation, with the chest wall 20 deforming and expanding. It will be understood that the chest wall 20 could be made of a single piece of deformable material, such as rubber or silicone, and still perform the same function of deforming during inhalation. However, this would result in only deformation rather than deformation leading to expansion, which is what a human chest wall experiences during inhalation. By having the chest wall 20 separated into a first segment 22 and a second segment 24, the first segment 22 and the second segment 24 move relative to each other, allowing the chest wall 20 to expand. While the chest wall 20 could be driven by the driving member into any desired position, the chest wall 20 is preferably driven such that the motion of the chest wall 20, both spatially and temporally, represent the movement of the human chest wall during inhalation.

After inhalation is complete the driving member 30 returns to its initial position. The driving member 30 may be actively returned to its starting position, or it may be passively returned to its initial position. For example the driving means 32 may act to return the driving member 30 to a starting position, or the driving means 32 may stop driving the driving member 30 and the chest wall 20, which may be resilient, returns the driving member 30 to its initial position. It will be understood that in the example shown in FIG. 2 the initial position of the driving member 30 would be representative of an exhalation position, however the initial position could potentially be an inhalation position, with the driving member being actuated to move the chest wall 20 into an exhalation position. If the chest wall 20 returns the drive member 30 to an initial position that represents exhalation then the chest wall 20 will be biased towards an exhalation position. In the embodiment shown in FIG. 2 the chest wall 20 is biased towards an exhalation position and the actuation of the motion mechanism expands the chest wall 20 into an inhalation position.

Figure 4A:
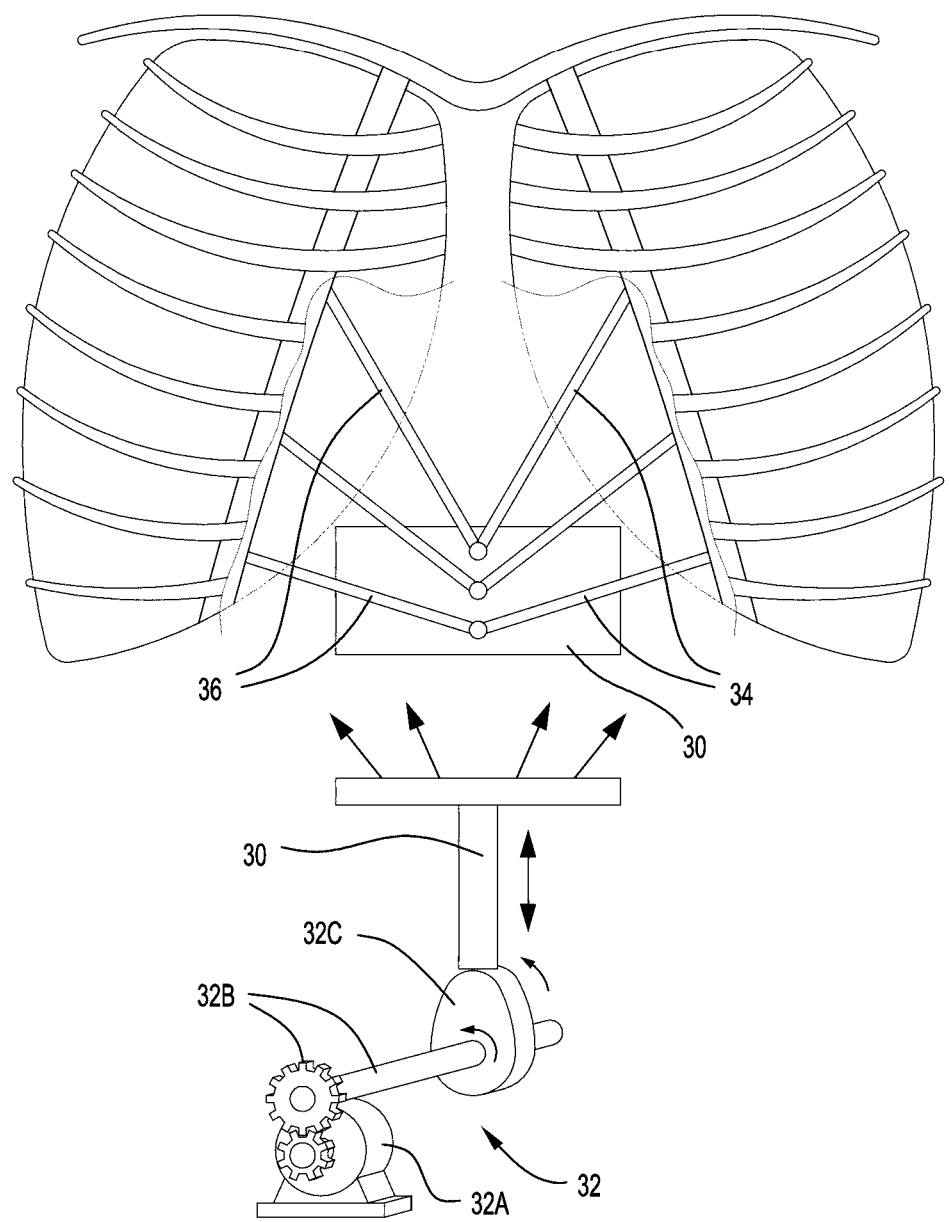
FIG. 4A is a front view of a phantom in FIG. 2 with a first motion mechanism attached to a chest wall at a plurality of points.

As shown in FIG. 4A, the driving means 32 is made up of a stepper motor 32A connected via a gear and shaft 32B to cam 32C. As the motor 32A turns the cam 32C is rotated and drives the driving member 30 in a linear motion in a direction from the back 16 of the body 12 towards the front 14 of the body 12. An advantage of a stepper motor is that it is able to be accurately positioned without a feedback sensor as the position of each step is known. It will be understood that while a stepper motor is used in this example it could be replaced with any other type of motor, for example a servo motor. Furthermore, it will be understood that the driving member 30 may be driven by any appropriate means. For example, the movement may be mechanical, such as a cable, a Bowden cable, gears, Cardan gears, cams, pulleys and belts, springs. Alternatively, the movement may be pneumatic or hydraulic, e.g. caused by fluid driven pistons in cylinders. It will be understood that any of the above-mentioned means may be used either alone or in combination to drive driving member 30. It will be understood that the stepper motor 32A and the cam 32C could be replaced with a pneumatic or hydraulic set up.

The advantage of having the stepper motor 32A connected to the cam 32C via a shaft 32B is that it allows the stepper motor 32A to remain outside of the cavity 18 of the body 12. Again, by using a stepper motor 32A a feedback sensor is not required in the internal cavity 18. By positioning the motor 32A outside of the internal cavity 18 the phantom 10 can be used to produce useful medical images using x-ray and computerised tomography (CT).

One example of positioning the stepper motor 32A outside of the internal cavity 18 is illustrated in FIG. 12. In FIG. 12 base plate 15 that acts as a base for the components, such as stepper motor 32A, to be attached to. The chest wall 20 may be connected to the base plate 15 in a similar manner to how the chest wall 20 can be connected to the spine 40, as described above. As illustrated in FIG. 12 the stepper motor 32A is mounted to the base plate 15 in an area that is outside of the internal cavity 18. In this way, the stepper motor 32A will not be present in images of the chest area of the phantom 10. Preferably all of the materials in the internal cavity 18 are anthropomorphic (e.g. the heart 50 and lung 60 have similar densities and electron densities to human organs, which is advantageous for calculating radiation dose) and can tolerate being exposed to mega-voltage (MV) photon beams in a clinical environment. By removing the non-anthropomorphic materials, e.g. metal or materials that have a much greater density than tissue and bone, from the internal cavity 18 the medical images produced will have fewer artefacts than if objects such as the metal stepper motor 32A were positioned inside of the internal cavity 18. Specifically, if the stepper motor 32A was placed in the internal cavity 18 of the phantom 10 the metal in the stepper motor would obscure the images as the x-rays would be heavily absorbed and scattered by the metal parts.

Figure 13:
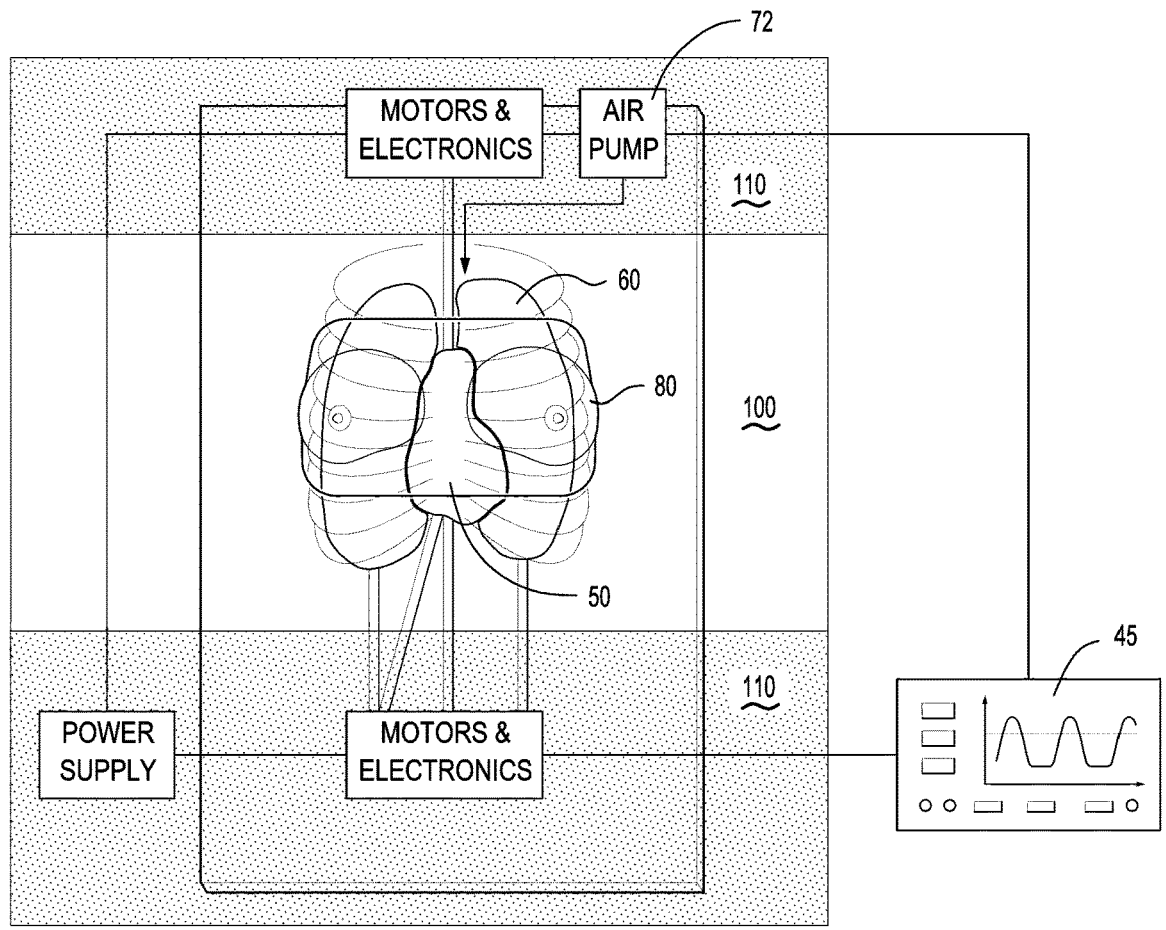
FIG. 13 is a schematic of a phantom being positioned with respect to a radiated zone and a radiation free zone.
Figure 14:
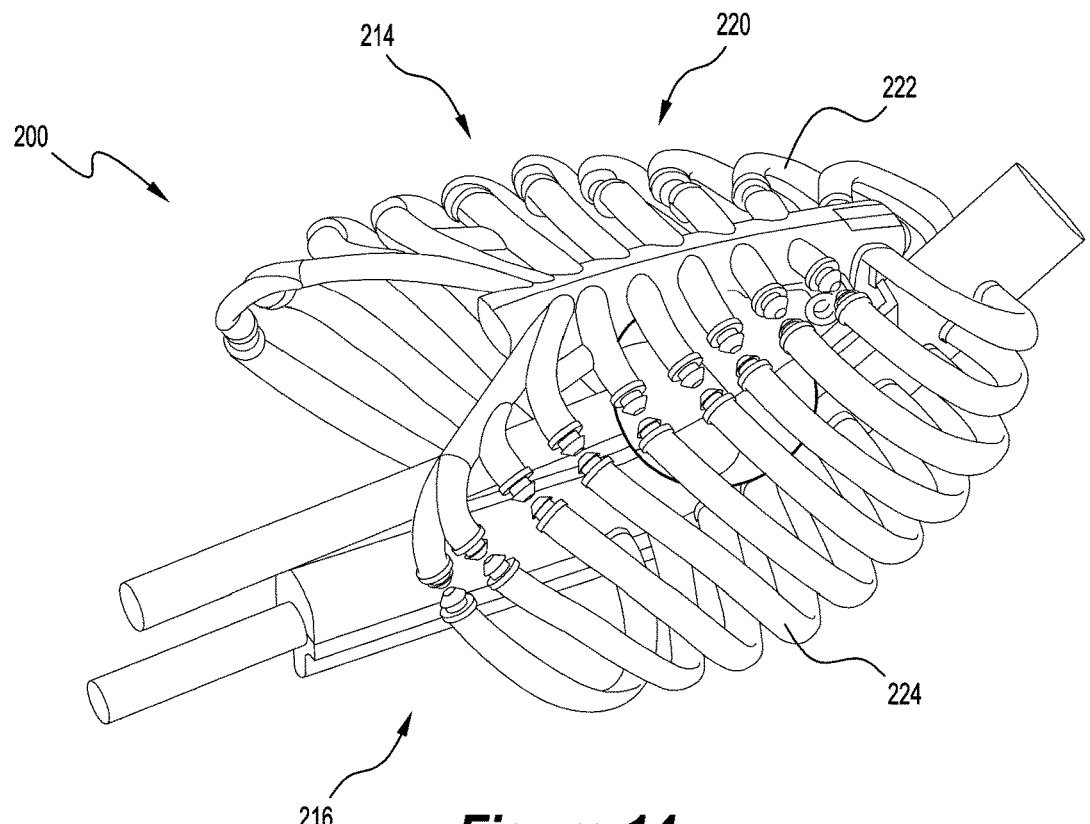
FIG. 14 a front isometric view of a dynamic phantom in accordance with another embodiment of the present invention.
Figure 15:
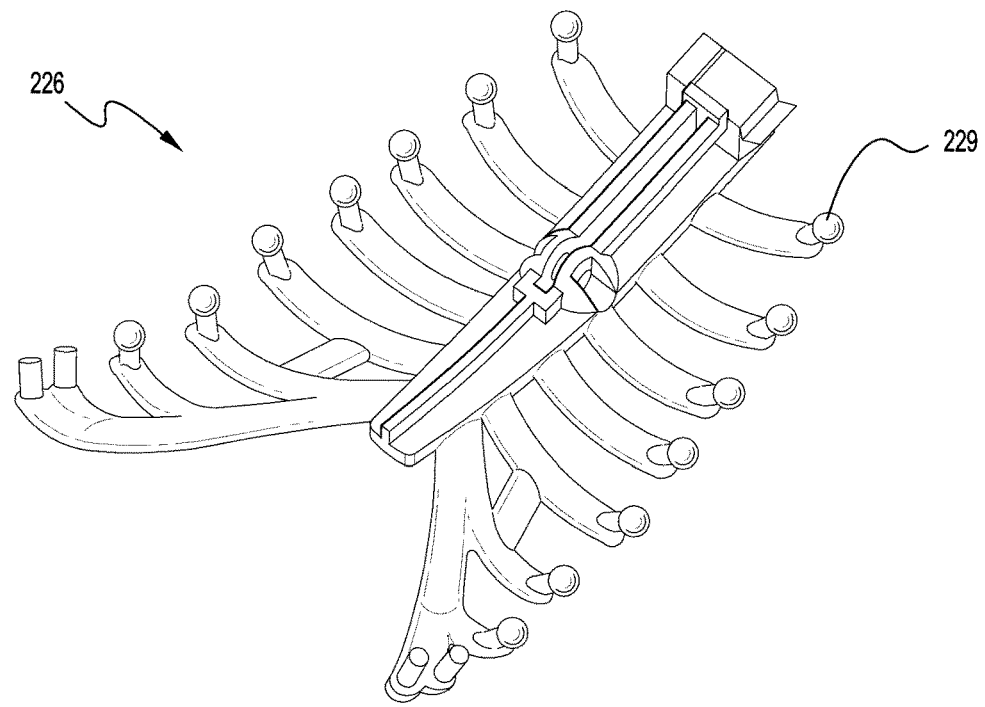
FIG. 15 is an isometric view of the underside of the breastbone and sternum of the phantom in FIG. 14.
Figure 16A:
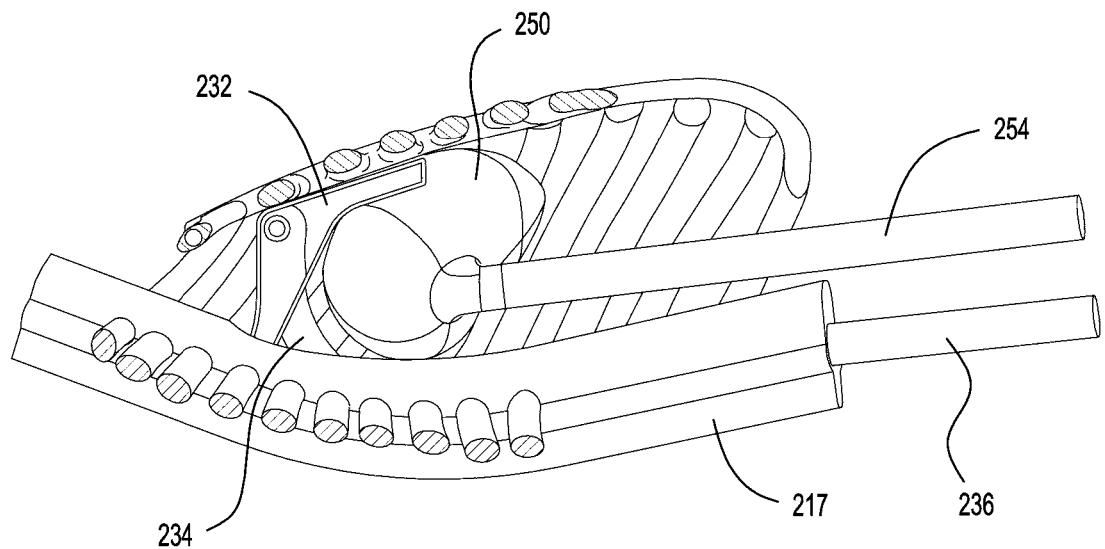
FIGS. 16a and 16b are cross-sectional views of the phantom in FIG. 14 in an exhalation and an inhalation position, respectively.
Figure 16B:
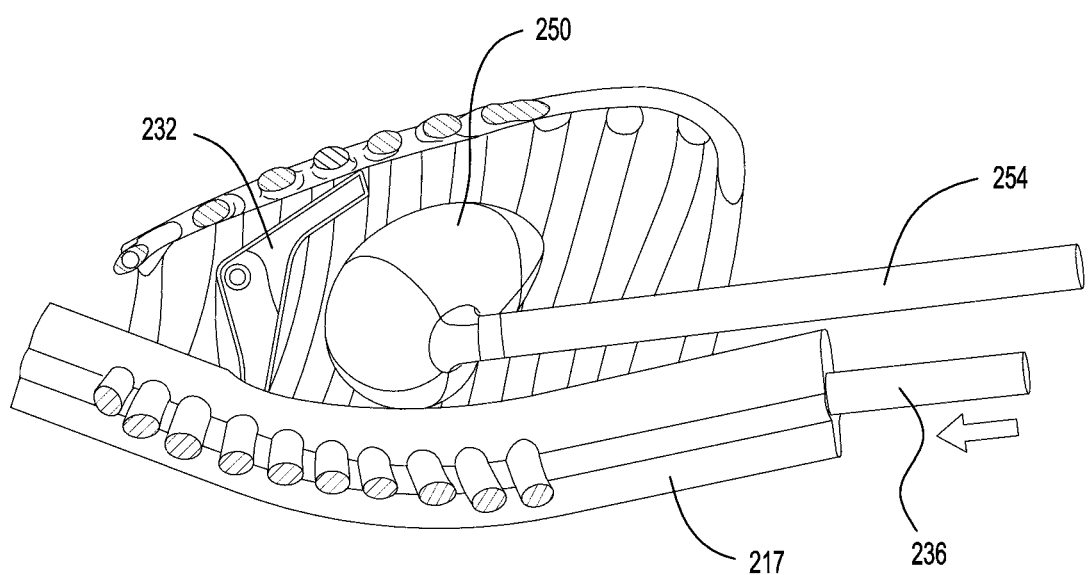

FIG. 13 illustrates the radiation zone 100 and the non-radiation zone 110 when imaging the phantom 10. The radiation zone 100 represents the area which will be irradiated, and therefore in which non-anthropomorphic materials should be avoided, while the non-radiation zone 110 represents the area which will not be irradiated, and therefore in which machinery should be located.

The phantom 10 is designed to mimic the movement of the human chest wall during respiration. Particularly, the phantom 10 is designed to mimic the displacement of the human chest wall and to mimic the frequency of the human chest wall displacement. Data on the displacement and frequency of the human chest wall movement could be obtained in a number of ways. For example, a number of patients could be analysed using four-dimensional computerised tomography (4DCT) or x-ray fluoroscopy, or other known methods, in order to obtain a number of real-world examples, from which an average could be calculated. In addition, the phantom 10 is designed to mimic not only the displacement of the human chest wall in a direction from the front 14 to the back 16 of the phantom 10, but also the overall expansion of the chest wall 20 during inspiration.

In addition to the movable chest wall 20, the phantom 10 also comprises a movable organ member that is located in the internal cavity 18. The movable organ member may be a heart 50, lung 60 or any other organ of interest. It will be understood that the phantom 10 could comprise more than one movable organ member, for example both a heart 50 and a pair of lungs 60. The moveable organ member is caused to move relative to the body 12 by a second motion mechanism. The second motion mechanism is designed to move the moveable organ member so that it simulates, or approximates, the physiological movement of the organ in a human.

The moveable organ member is caused to move relative to the back 16 of the body 12. If the movement of the movable organ member is designed to represent the movement of an organ in the thorax of a person as the chest expands and contracts during respiration then the movable organ member will be synchronised with the movement of the chest wall 20 and caused to move by a second motion mechanism. The synchronisation of the chest wall 20 and the movable organ member is achieved by the first and second motion mechanisms being synchronised to substantially represent the movement of inhalation and exhalation in the human body.

Figure 3:
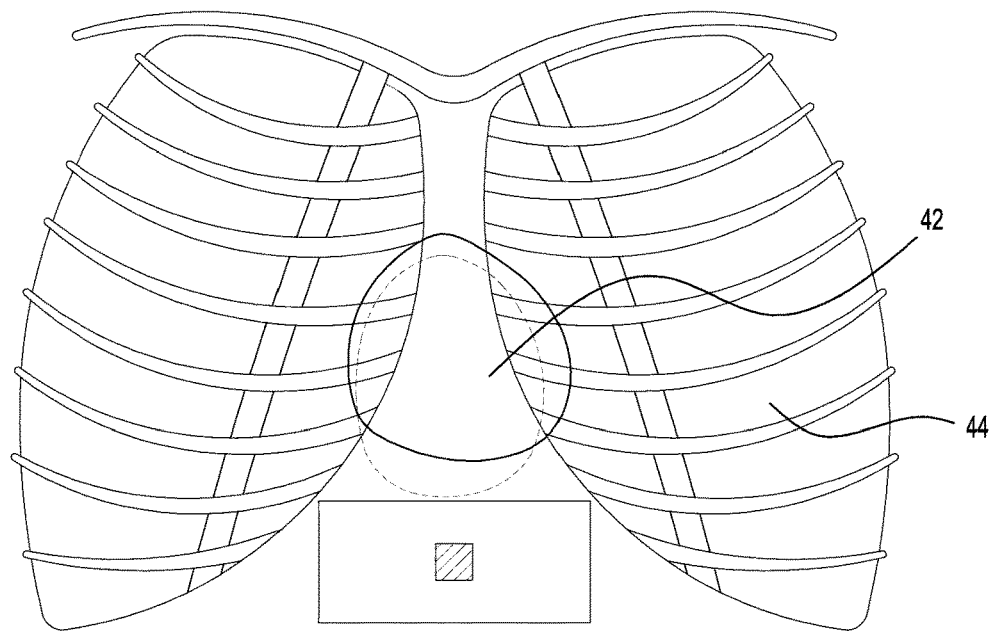
FIG. 3 is a front view of the phantom in FIG. 2.
Figure 4B:
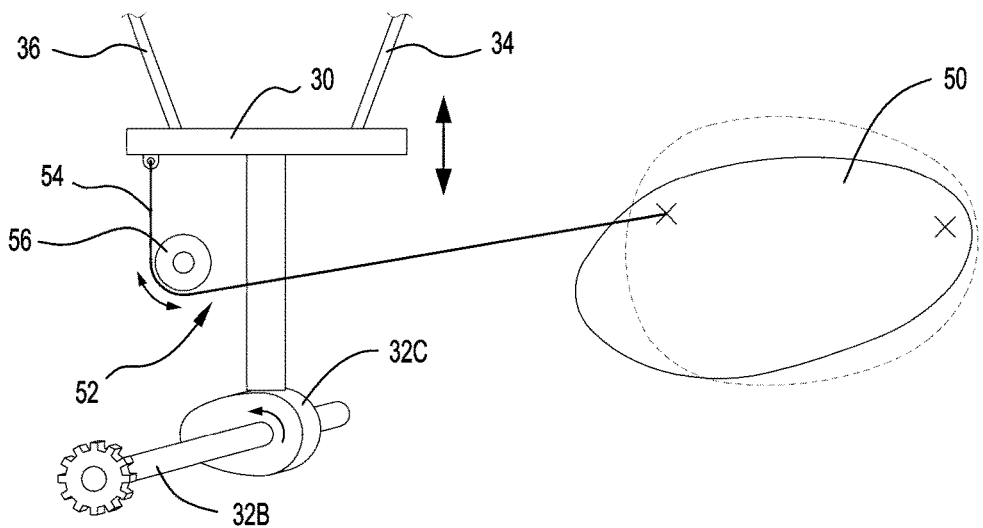
FIG. 4B is a schematic of a first motion mechanism and a second motion mechanism in accordance with an embodiment of the present invention.
Figure 5:
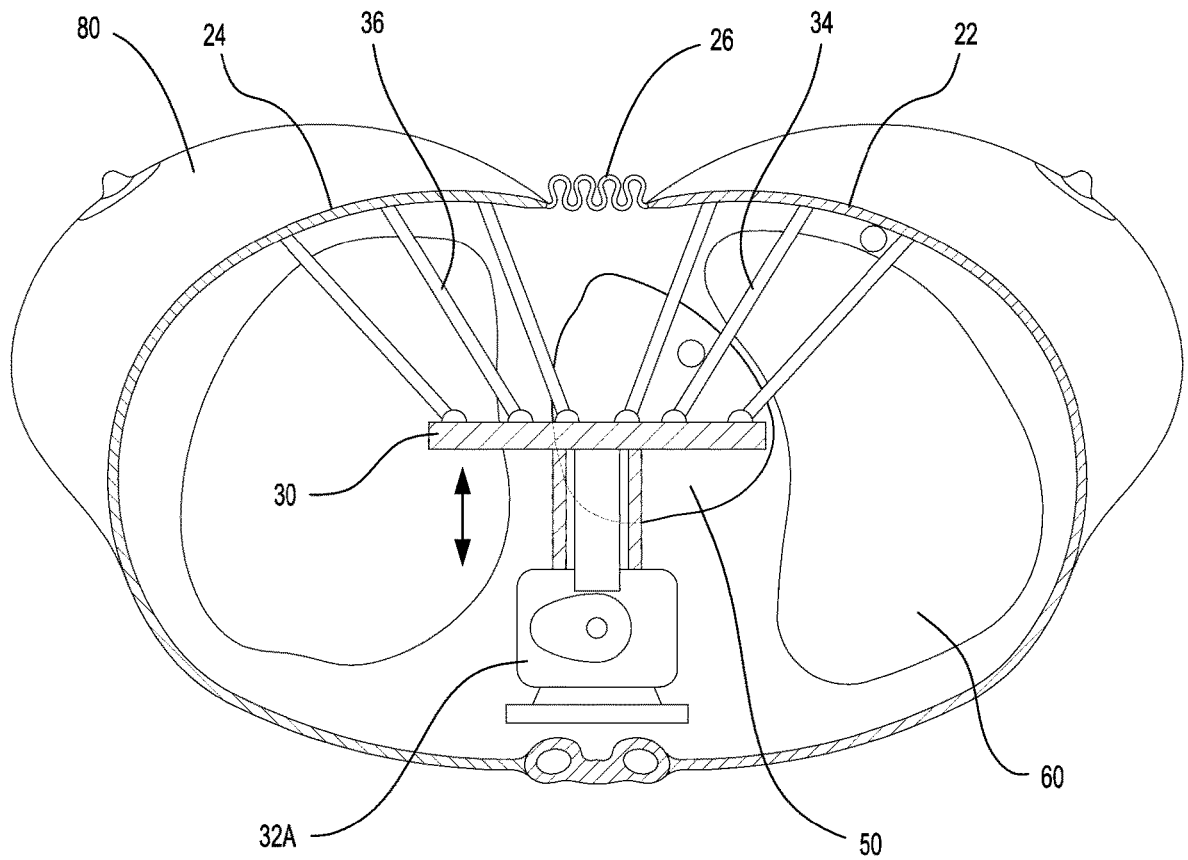
FIG. 5 is a bottom view of a phantom in accordance with an embodiment of the present invention.

FIGS. 3 to 5 illustrate the phantom 10 comprising two movable organ members, a heart 50 and a pair of lungs 60. It will be understood that the phantom 10 would function with either the heart 50 or the pair of lungs 60. The heart 50 may be an object that is analogous to a human heart. For example, the heart may be represented by a heart-shaped volume of material similar to silicone gel. Similarly, the pair of lungs 60 may be an object that is analogous to a pair of human lungs. The pair of lungs 60 could be any inflatable object, for example, the pair of lungs 60 may be represented by sponges wrapped and sealed by silicone coating that is airtight. It is understood that a tubing structure could be built into the pair of lungs 60 that is similar to the human trachea and bronchus system. The tubing structure may be made of rubber or silicone and be designed to be similarly deformable and expandable as the rest of the lung 60 when it is under the pressure from incoming airflow and the force from the motion mechanism that stretches the lungs 60 inferiorly. Preferably the heart 50 and lungs 60 will be resilient. It will be understood that the heart 50 and the pair of lungs 60 will be capable of simulating the motions that occur during free breathing and during deep inhalation breathing. As the phantom 10 is designed to represent the movement of inhalation and exhalation, it will be understood that accurately representing the shape of the movable organ members will be of greater importance than matching the electron density etc. of the organ.

Figure 6A:
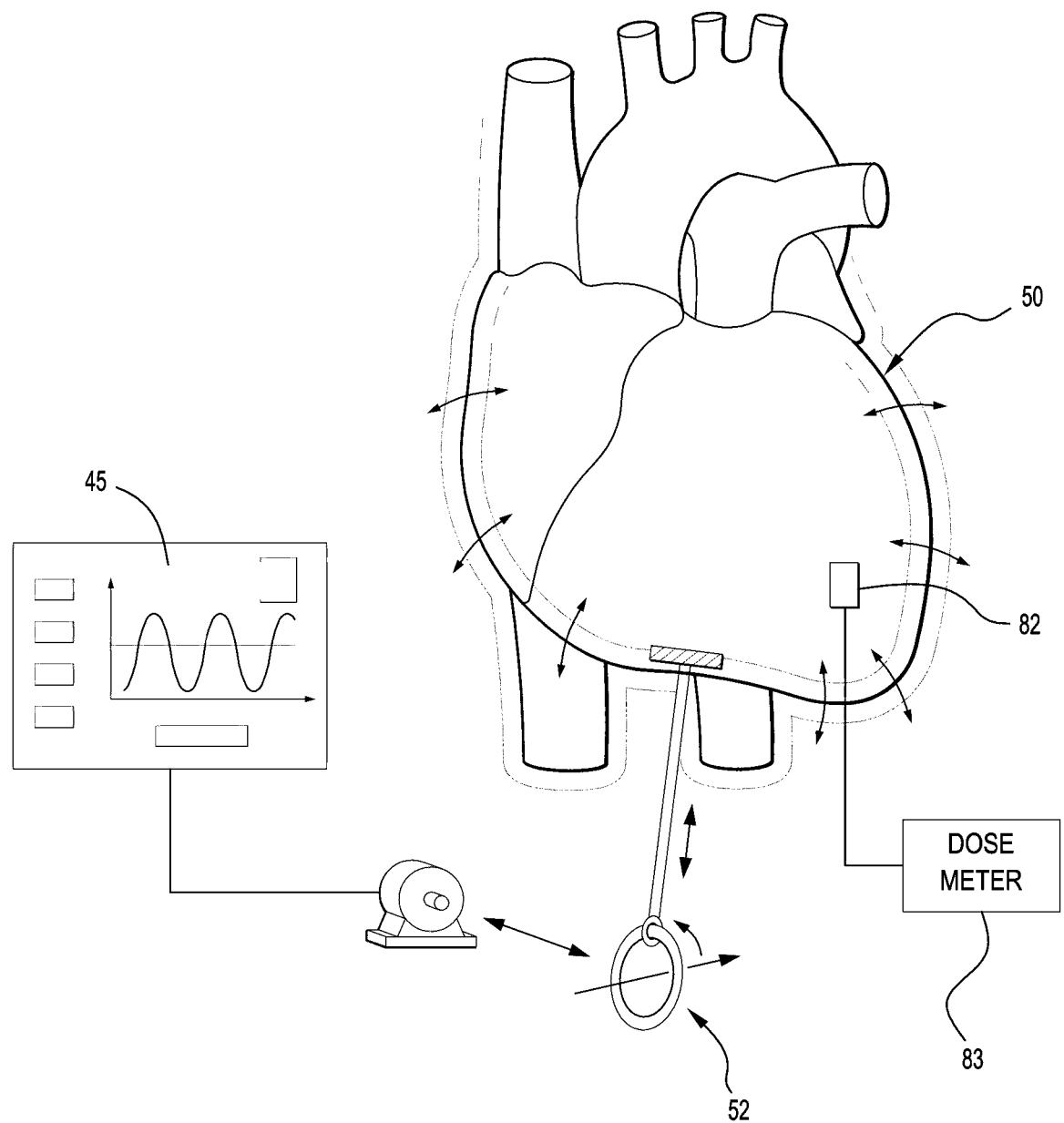
FIG. 6A is a schematic of a movable organ member in accordance with an embodiment of the present invention.

The heart 50 may be moved by the second motion mechanism 52. As illustrated in FIG. 6A, the heart 50 may be deformed by the second motion mechanism 52. In particular, FIG. 6A illustrates a heart 50 that is fixed at one end 51 (relative to the back), while the second motion mechanism 52 stretches the heart 50, resulting in the heart 50 deforming. The heart 50 may be biased towards a first position and the second motion mechanism 52 may stretch the heart 50 to move a second end 53 of the heart 50 relative to the first end 51 of the heart 50. It will be understood that the stretching of the heart could be achieved either by pulling the heart 50 or by pushing a non-fixed portion of the heart 50 away from a fixed portion of the heart 50.

FIG. 4B illustrates one way in which the drive member 30 and the second motion mechanism 52 could be combined. As illustrated in FIG. 4B the second motion mechanism 52 may comprise a cable 54 and a pulley 56. One end of the cable 54 is connected to the non-fixed portion of the heart 50 and the other end of the cable 54 is attached to the driving member 30 via the pulley 56. As the first motion mechanism is moved the second motion mechanism 52 is also driven. The pulley 56 acts to guide the cable 54 to enable the driving member 30 and the second motion mechanism 52 to act in different directions. The cable 54 can be made of any suitable material, however it is preferably made from Nylon or a similar type of durable material with strong mechanical strength. The pulley 56 can be made of Teflon or similar types of durable plastic materials. Both Nylon and Teflon are commercially available and have similar density to the tissue of the body, and therefore will not interfere with CT imaging or attenuation of the radiation beam if it is in the path of the radiation beam. It will be understood that the motion mechanisms could be combined in other mechanical embodiments, or could be combined using hydraulics or pneumatics.

In the human body the heart moves in a complex cardiac motion of combined expansion and contraction plus rotation during regular respiration. The heart will move inferior (towards the feet) and posterior (towards the spine) to a greater extent during deep inspiration. As such, the second motion mechanism 52 may be positioned so that the actuation of the second motion mechanism 52 moves the heart 50 towards the back of the body 12 and towards a lower end 19 of the body 12. It will be understood that the motion mechanism 52 could be positioned to move the heart 50 in any direction desirable. For example, the motion mechanism 52 could move the heart in an axis generally representing top to bottom, left to right, front to back of the phantom, or any combination of these, such as the above-described movement of the heart 50 towards the back of the body 12 and towards a lower end 19 of the body 12. It is intended that the movement of the heart 50 in the phantom 10 represents the movement of a heart in a living human caused by the respiration cycle. That is, the heart 50 is moved in the correct direction relative to the chest wall 20 and other organs, and it is moved in the correct distance and at the correct frequency. The distance and frequency can be controlled and adjusted by the user of the phantom 10.

It is understood that the displacement of a human heart due to the inflation of the lungs is related to the level of inflation of the lungs. Therefore, if the phantom 10 is configured to mimic the regular breathing of a person the heart 50 will move less over an inspiration/expiration cycle than it will during a deep inhalation breath hold. It will be understood that the movement of the human heart will also vary between men, women and children, as the inflation of the lung will be different for each of these groups. It is understood that the user, through the computer software, is able to choose between a free breathing cycle and a deep inhalation breath hold cycle, with the computer software linking each breathing pattern with a corresponding heart 50 movement.

It should be noted that while there is movement of the heart due to the inflation of the human lung and the expansion of the chest cavity, there is also movement of the heart due to the pumping action of the heart that supplies blood to the body. It will be understood that the pumping action of the human heart could be included in the phantom 10. For example, the phantom could be designed such that a) only the longitudinal stretching motion of the heart is simulated, b) only the motion due to the heart pumping is simulated, or c) both the longitudinal stretching motion of the heart and the motion due to the heart pumping are simulated.

FIGS. 6B and 6C show a mechanism for rotating the heart 50 in order to mimic the rotation of a human heart caused by the pumping of the heart. As described above regarding FIG. 6A, the heart 50 is able to be deformed longitudinally by the motion mechanism 52, with the heart 50 being fixed at one end 51 and the drive member being attached at a second end 53. A sleeve 94, which the motion mechanism 52 extends through, is coupled the second end 53 of the heart 50. An outer surface 94' of the sleeve is toothed to allow rotation of the sleeve by a gear 95 that is connected to a motion mechanism, shown as motor 96. The teeth on the outer surface 94' of the sleeve 94 extend longitudinally so the teeth maintain contact with the gear 95 when the heart 50 is deformed longitudinally by the motion mechanism 52. A biasing member, such as a spring 130, inside the sleeve 94 may be included to rotationally bias the sleeve in either direction. When the motor 96 is activated the gear 95 is rotated, which in turn rotates the sleeve 94, thereby rotating the second end 53 of the heart 50 relative to the first end 51 of the heart.

During free breathing the longitudinal movement of the heart 50 will be relatively small and it may be desirable to only consider the rotational movement of the heart. Therefore it is envisaged that, if there are three motion mechanisms (one for the chest wall, one for the longitudinal movement of the heart, and one for the rotational movement of the heart), the motion mechanism 52 for longitudinal movement of the heart 50 may be not active during free breathing. Referring to FIGS. 6B and 6D, it is also envisaged that where the motion mechanism for the longitudinal movement of the heart and the chest wall are combined a coupling 97 may be provided, such as a sleeve 98 with a locking pin 99, to allow the longitudinal movement of the heart to be actively selected or deselected. For example, it may be desirable to have the longitudinal movement of the heart deselected during free breathing but selected during DIBH.

Figure 6E:
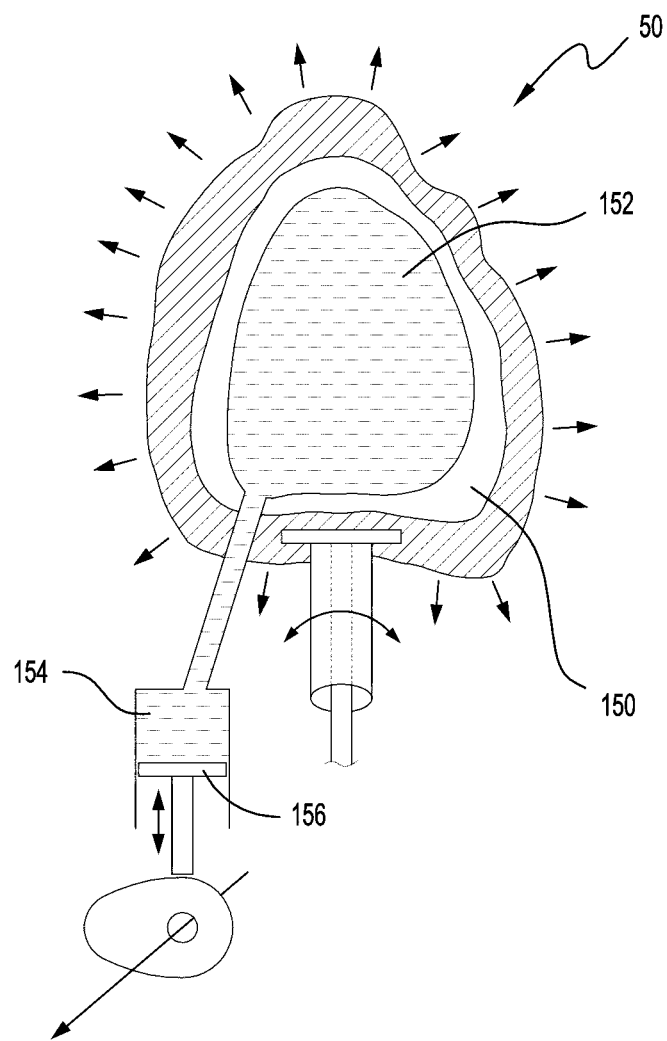
FIG. 6E is a schematic of the movable organ member in FIG. 6B with an further motion mechanism.

Furthermore, as shown in FIG. 6E, the expansion and contraction that a human heart experiences over the cardiac cycle may also be included in the heart 50. The heart may have a cavity 150 with an internal chamber, shown as balloon 152, filled with a liquid, such as water. The balloon 152 is in fluid communication with a reservoir 154. A pumping device, such as a piston 156, acts to pump water from the reservoir 154 into the balloon 152. As water is pumping into the balloon 152 the cavity 150 in the heart 100 is filled by the balloon 152 and the heart 50 is caused to expand by stretching the heart 50. When the pumping is stopped the relaxing of the heart 50 back into its normal state pushes the water back into the reservoir 154. Alternatively, the piston may actively pump water back into the reservoir 154. The pumping device may be considered a motion mechanism, as it acts on the heart 50 to fill the balloon 152 with water, thereby expanding the heart 50 and moving the heart 50 relative to the body 12 of the phantom 10.

Figure 7:
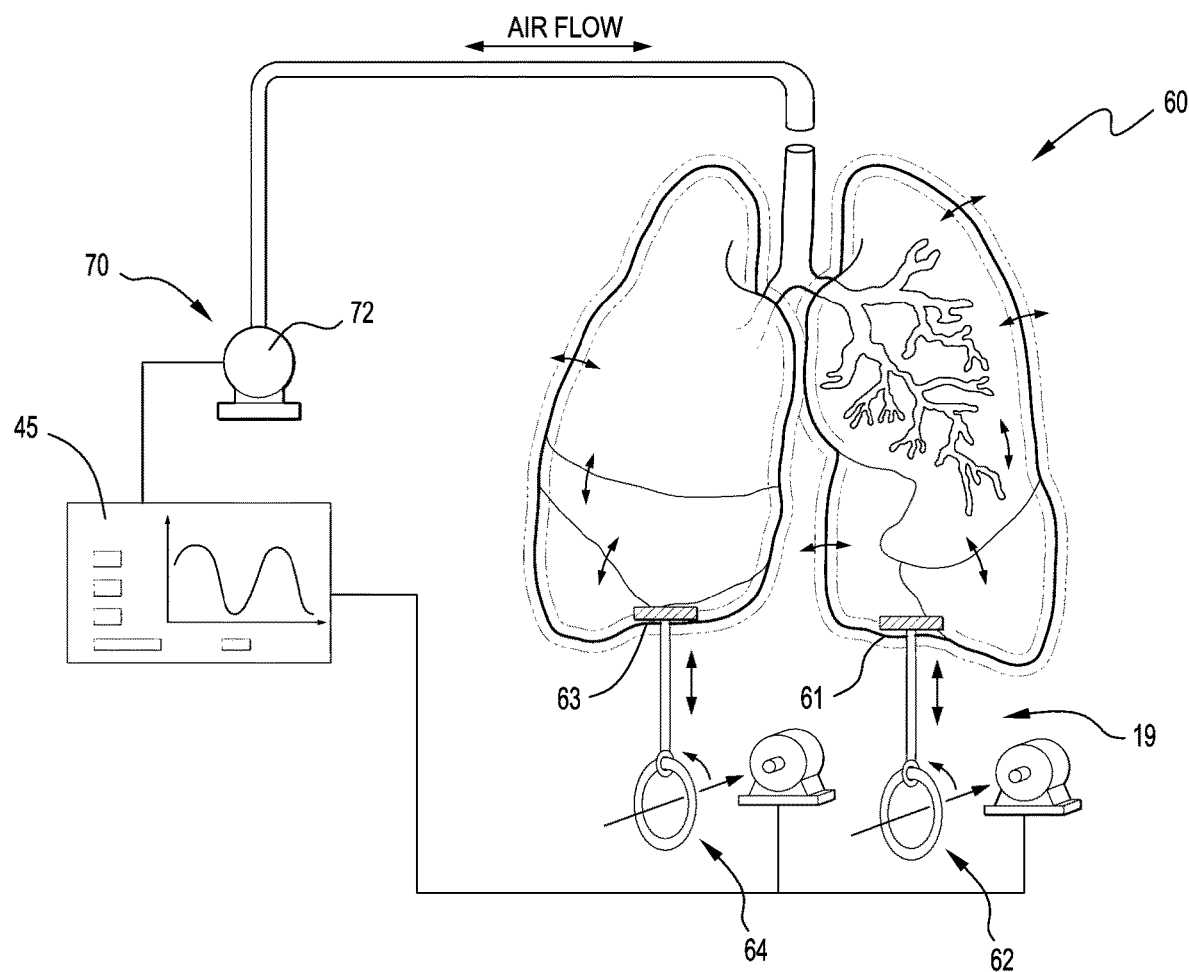
FIG. 7 is a schematic of another movable organ member in accordance with an embodiment of the present invention.

FIG. 7 illustrates a pair of lungs 60 that are moved by several motion mechanisms. The lungs 60 are connected to a ventilator 70, which may be made up of an air pump 72 in fluid communication with the lungs 60. The ventilator 70 may be considered a motion mechanism, as it acts on the lungs 60 to fill the lungs 60 with air, thereby inflating them and moving them relative to the back 16 of the body 12. In order for the lungs 60 to inflate the lungs 60 may be hollow with an opening in fluid communication with the ventilator 70. In addition to the ventilator 70, the embodiment shown in FIG. 7 illustrates two further motion mechanisms 62,64 attached to the bottom of each of the pair of lungs 60. The motion mechanisms 62, 64 pull the lungs towards a lower end 19 of the body 12 during inhalation. The lungs 60 are deformable and expand when moved towards the lower end 19 of the body 12 during inhalation. It is understood that the pair of motion mechanisms 62,64 attached to the bottom ends 61,63 of the lungs 60 could be replaced with a single motion mechanism connected to both bottom ends 61,63 of the lungs 60 (not shown). In addition, it will be understood that only one of the ventilator 70 and the one or two motion mechanisms 62, 64 are required to move the pair of lungs 60. For example, the lungs 60 could be connected only to the ventilator 70, which would inflate the lungs 60 causing them to expand and deform. Alternatively, the lungs 60 could be connected to only one or more motion mechanisms capable of pulling the lungs towards the lower end 19 of the body 12. As was described regarding the heart 50, it will be understood that the pulling of the lungs 60 could be achieved either by pulling the lungs 60 or by pushing a non-fixed portion of the lungs 60 away from a fixed portion of the lungs 60.

It is understood that while ventilator 70 is illustrated as an air pump 72 in FIG. 7, the ventilator could be any device capable of inflating the pair of lungs 60 during inspiration, and allowing the air to exit the pair of lungs 60 during expiration. For example, the air pump 72 could be replaced with pressure source greater than atmospheric pressure with a valve between the pressure source and the pair of lungs 60, the valve opening to allow air to flow from the pressure source to the lungs 60. It is understood that both the inflation of the lungs 60, and the pulling of a lungs 60, will be capable of simulating human lung motions for both free breathing and deep inhalation breathing situations.

As the direction of movement of the lungs 60 will be different to the heart 50, the motion mechanisms 62,64 will move the lungs 60 in a different direction to the heart 50. Having multiple motion mechanisms allows the movement of each of the lungs 60 to be separately controlled and allows the organs to be driven in the direction that represent the movement of the human organs during inhalation and exhalation. The movement of the human lungs varies at different locations inside the lungs, in both direction and magnitude, due to the properties of the lung. It will be understood that the complex 3D movement of the lungs 60 can be varied by altering the density of the lungs 60 (e.g. non-homogenous), the bronchus system built inside the lungs and the movement caused by the motion mechanisms 62,64, alone or combined with the ventilator 70. Preferably, the lungs 60 will be capable of producing the hysteresis that is present in human lungs, enabling the non-identical three-dimensional motion to be studied.

The inflation of the lungs 60 is designed to mimic the movement and expansion of the human lungs during inspiration, and is synchronised with the pulling of the lungs 60 during an inspiration movement. Such movement is required when investigating lung cancers in which the position of the cancer varies during the respiration cycle. It will be understood that the lungs 60 could be a pair of human lungs. While the heart 50 and the lungs 60 have been described, it will be understood that any organ of interest could be used as the movable organ member, either in addition to the heart 50 and lungs 60, or instead of the heart 50 and lungs 60.

In the embodiments shown in FIGS. 6 and 7 the motion mechanisms 52,62,64 comprise a stepper motor connected via a gear and shaft to cam, as was described in relation to the chest wall 20. It will be understood that while a stepper motor is used in this example it could be replaced with any other type of motor, for example a servo motor. Furthermore, as discussed above, the stepper motor and the cam could be replaced with a pneumatic or hydraulic set up.

A drive source drives the motion mechanisms 52,62,64. The drive source may be the same as the computer 45 that drives the first motion mechanism 30, or the motion mechanisms 52,62,64 may be controlled by one or more other drive sources. It would be advantageous to have all of the motion mechanisms driven by a single drive source as this would remove complexity in the synchronisation of events and reduce the number of operators required to operate the phantom 10.

As one of the potential applications for the phantom 10 is for conducting quality assurance testing, and commissioning of the inhalation breath hold techniques used for treating breast cancer, the body 12 of the phantom 10 may also include a pair of female breasts 80, as illustrated in FIGS. 5, 8, 9, 10, 12 and 13. The breasts 80 may be made of material with similar properties to that of the soft tissue in the breast. For example, the breast 80 could be made from silicone or combined products that are used in clinical procedures of female breast enlargement, with a silicone coating or protection layer. Preferably, the breast 80 will be deformable and will react in a similar way to human breasts during the respiration cycle. Furthermore, the breast 80 will deform as an effect of gravitation when the phantom 10 is positioned at its supine (face-up) or in other positions, for example, on-side or prone (face-down) in clinical situations. The breasts may be built as part of chest wall 20, or may be an additional layer 90 that is separately attached to the outer surface of the chest wall 20. FIG. 12 illustrates a rib cage 28 acting as the chest wall 20, with the additional layer 90 being attached to the rib cage 28.

FIGS. 14 to 25 show an alternative embodiment of a dynamic phantom 200. The phantom 200 comprises a body 212 having a front 214, a back 216, and an internal cavity 218 between the front 214 and the back 216. The body 212 has a movable chest wall 220 at the front 214 of the body 212. A first motion mechanism, shown as articulated linkage 230, is actuated to move the chest wall 220 to thereby move the front 214 of the body 212 relative to the back 216 of the body 212. The movement of the movable chest wall 220 is designed to represent the movement of the chest as it expands and contracts during respiration.

The phantom has a moveable organ member, shown as heart 250, supported within the internal cavity 218. The heart 250 is caused to move relative to the body by a second motion mechanism, shown as motor 252. A drive source, such as a controller/computer 245, drives the first and second motion mechanisms 230, 252. The first and second motion mechanisms 230, 252 are designed to substantially represent the movement of inhalation and exhalation in a human body. The movement generated by the first and second motion mechanisms 230, 252 will in some instances be related, and in some instances synchronised, to substantially represent the movement of inhalation and exhalation in a human body.

Figure 23:
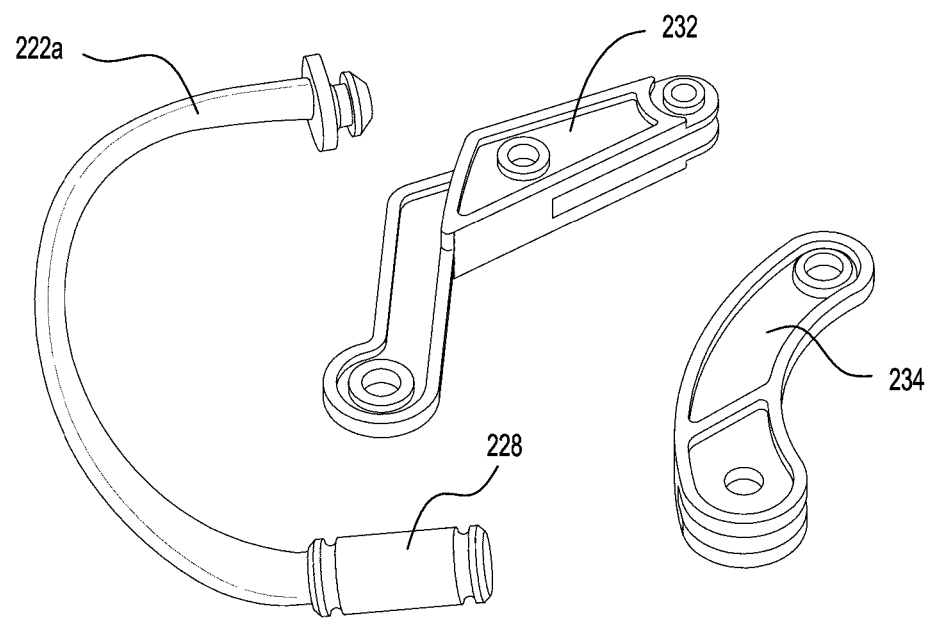
FIG. 23 is a layout of several components of the phantom in FIG. 14.

The chest wall is made up of a first segment, shown as right ribs 222, a second segment, shown as left ribs 224, and a third segment, shown as breastbone 226. FIG. 23 shows a single rib 222a. The breastbone 226 connects the right ribs 222 to the left ribs 224. The breastbone 226 loosely mimics the sternum and breastbone in the human body, and is shaped similar to a breastbone of a human. The left ribs 222 and the right ribs 224 loosely mimic the ribs in the human body, and are shaped similar to the ribs of a human. The breastbone 226 is flexibly connected to the right ribs 222 and the left ribs 224. The left ribs 222 and the right ribs 224 are connected to the back 216 of the phantom 200, specifically at a spine 217. The left ribs 222 and the right ribs 224 are attached to the spine 217 so that they can rotate relative to the spine 217. The flexible connection between the breastbone 226 and the right ribs 222 and the left ribs 224 is achieved by a connector, such as an elastomeric hinge 228. The ribs 222, 224 and the breastbone 226 have nodules 229 that connect to recesses 228a in the elastometic hinge 228. The breastbone 226 is hingedly connected to the spine 217 by two rib members 226a at the top of the breastbone 226. The spine 217 is made up of two parts 217a, 217b.

Figure 17A:
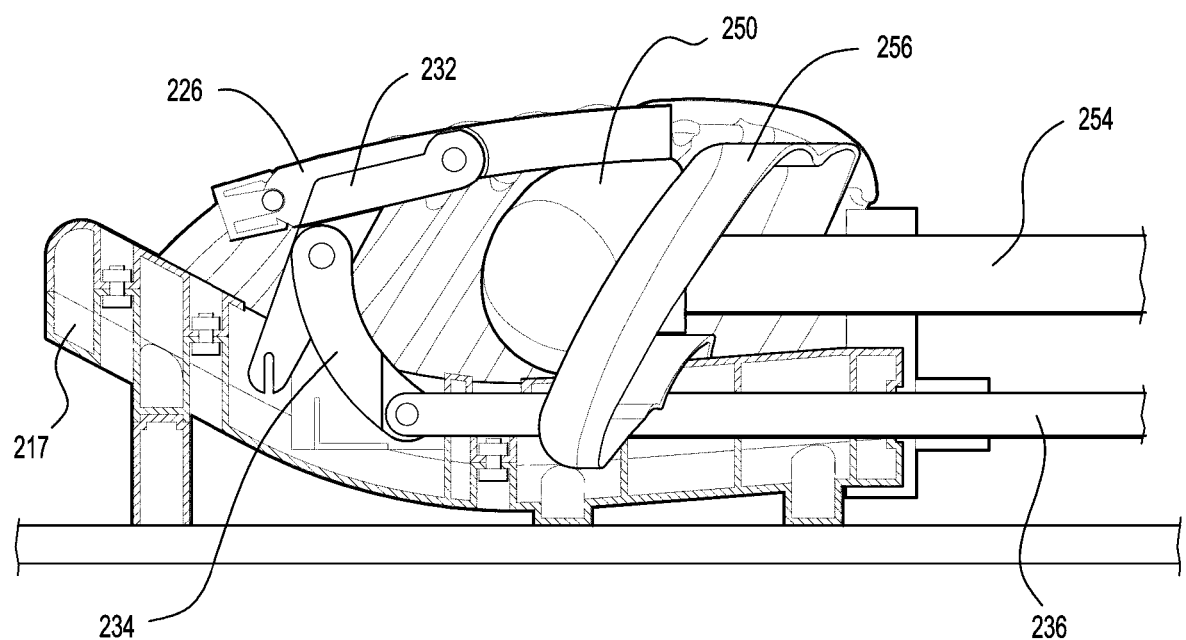
FIGS. 17a and 17b are cross-sectional views of the phantom in FIG. 14 showing the breastbone connection in an exhalation and an inhalation position, respectively.
Figure 17B:
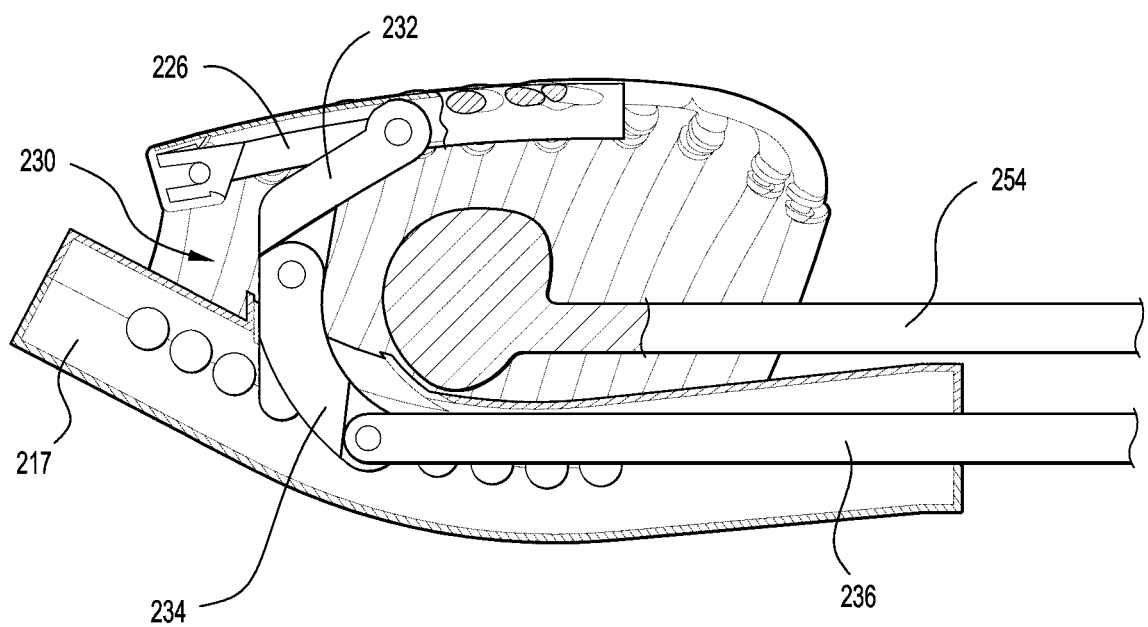
Figure 18:
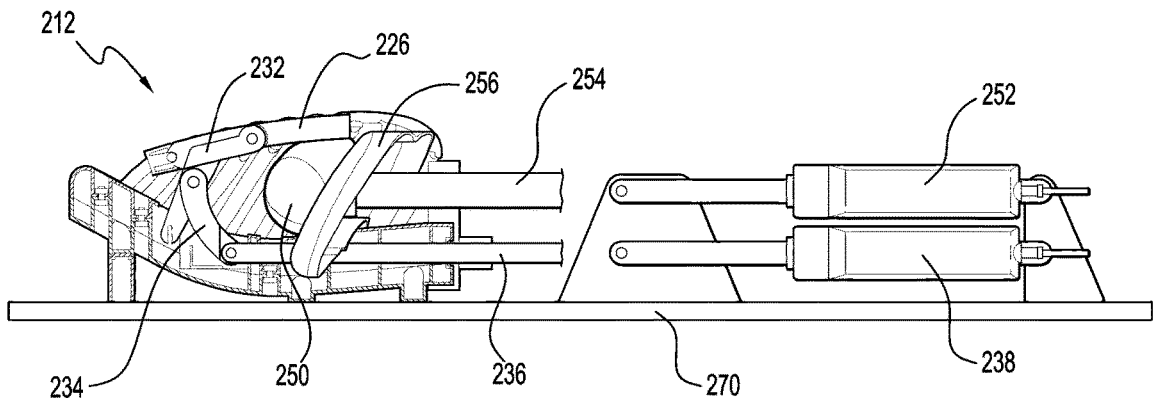
FIG. 18 is a cross-sectional view of the phantom in FIG. 14 in the exhalation position and attached to driving means.
Figure 19A:
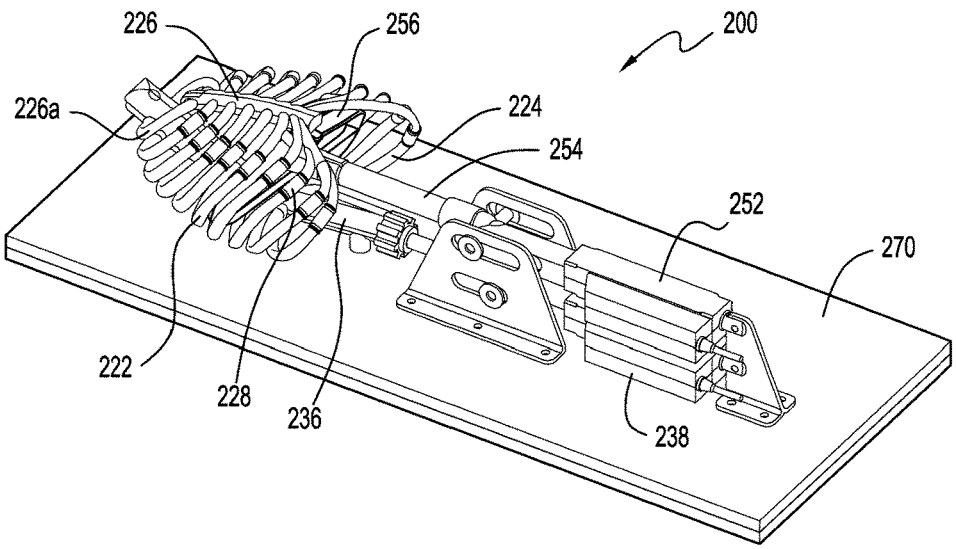
FIGS. 19a and 19b are isometric views of the phantom in FIG. 14 in an exhalation and an inhalation position, respectively.
Figure 19B:
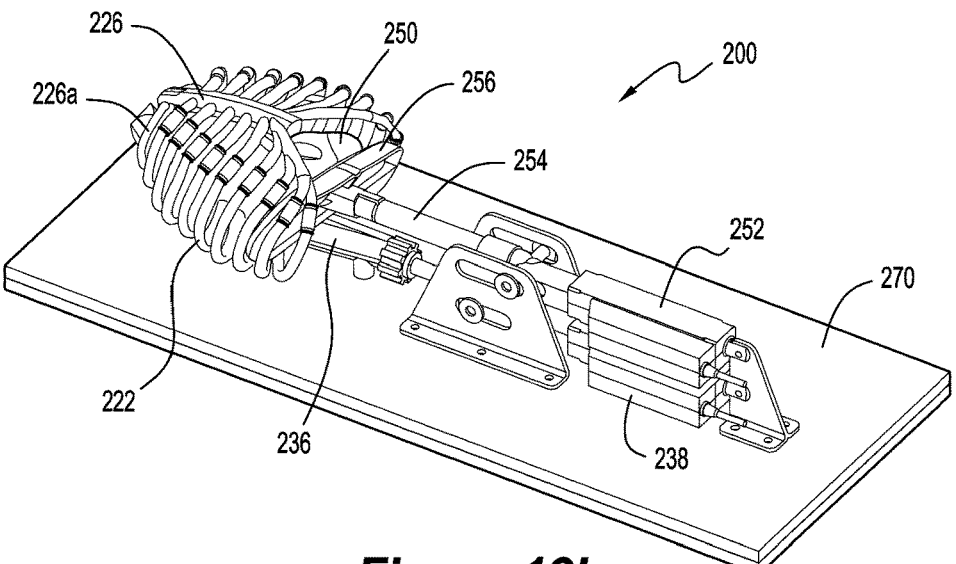
Figure 20A:
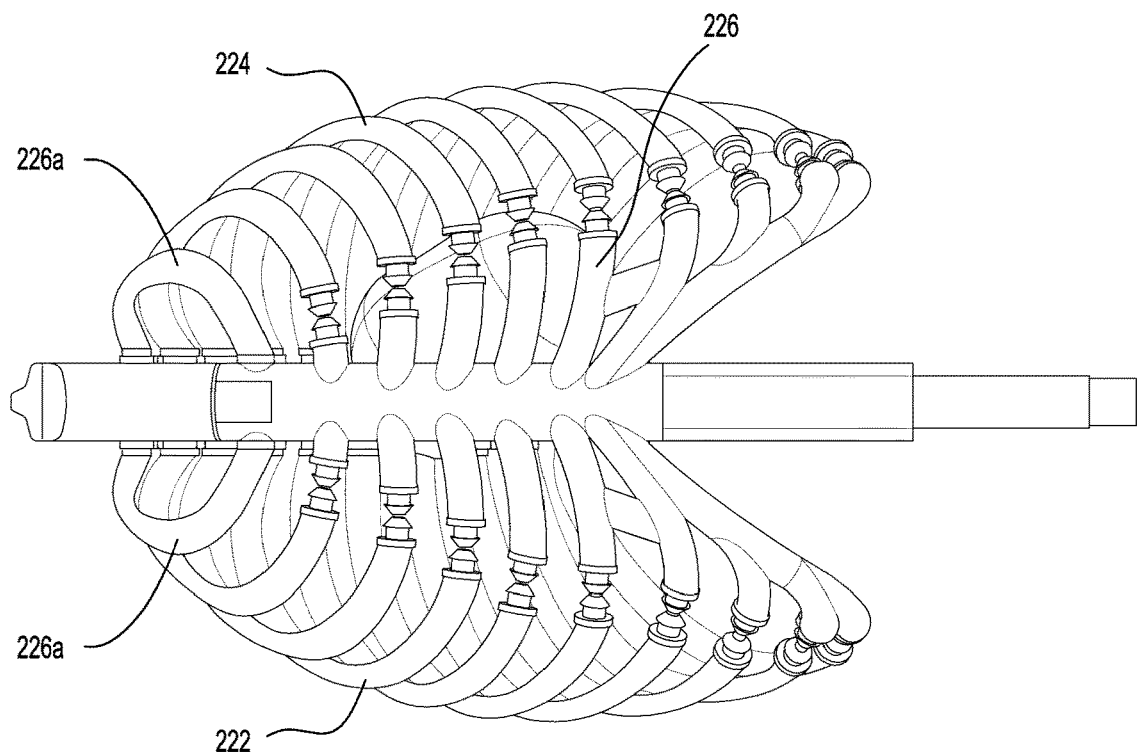
FIGS. 20a and 20b are plan views of the phantom in FIG. 14 in an exhalation and an inhalation position, respectively.
Figure 20B:
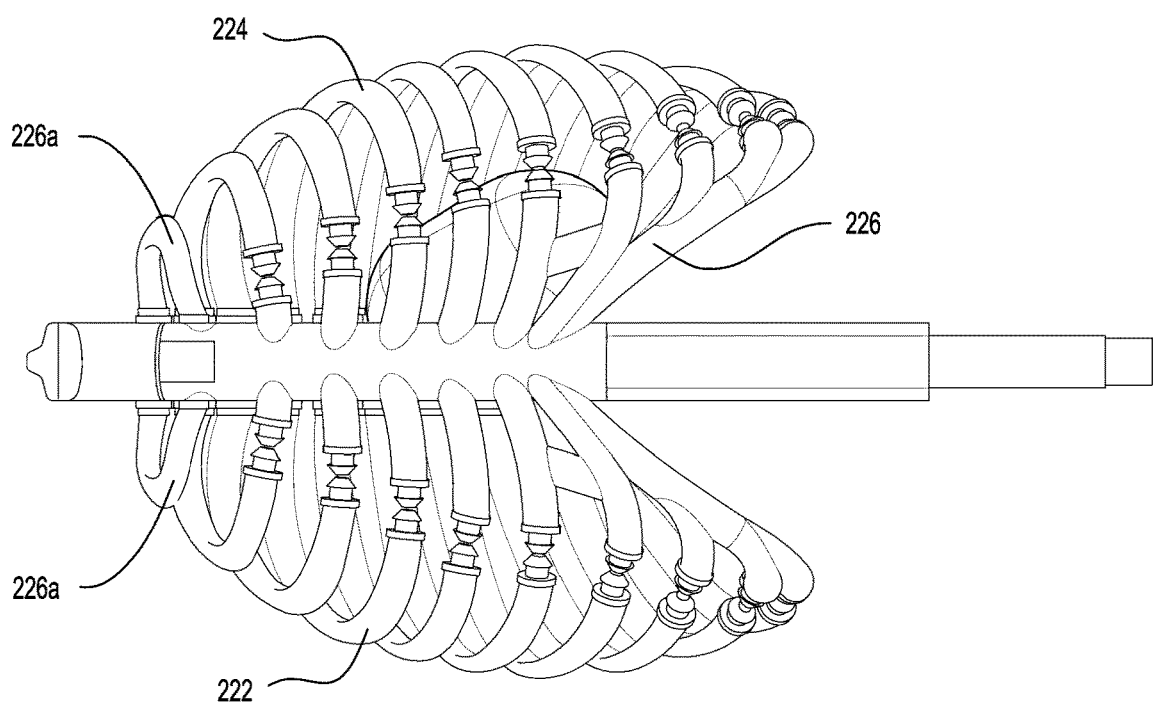
Figure 21A:
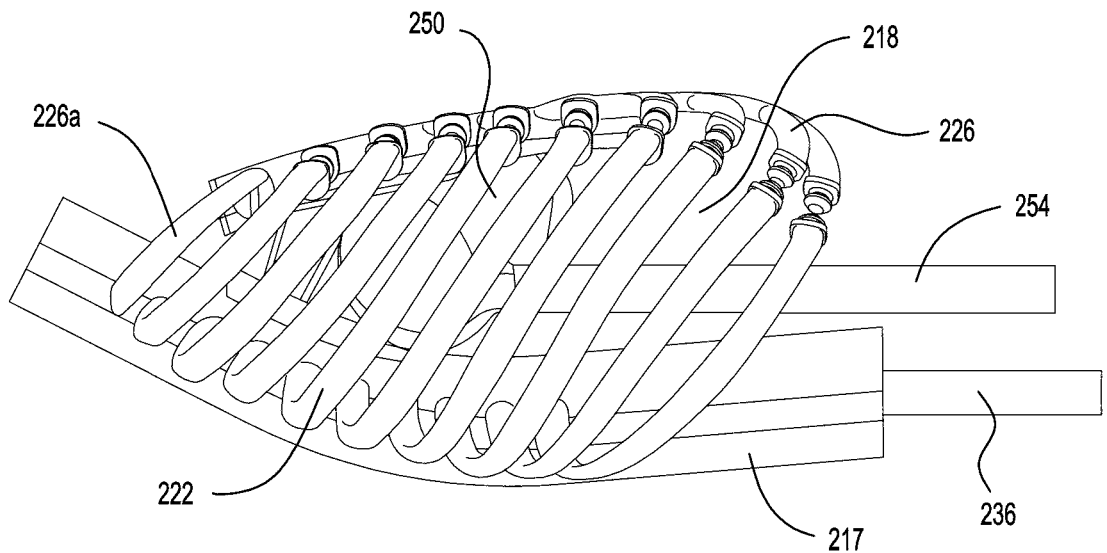
FIGS. 21a and 21b are side views of the phantom in FIG. 14 in an exhalation and an inhalation position, respectively.
Figure 21B:
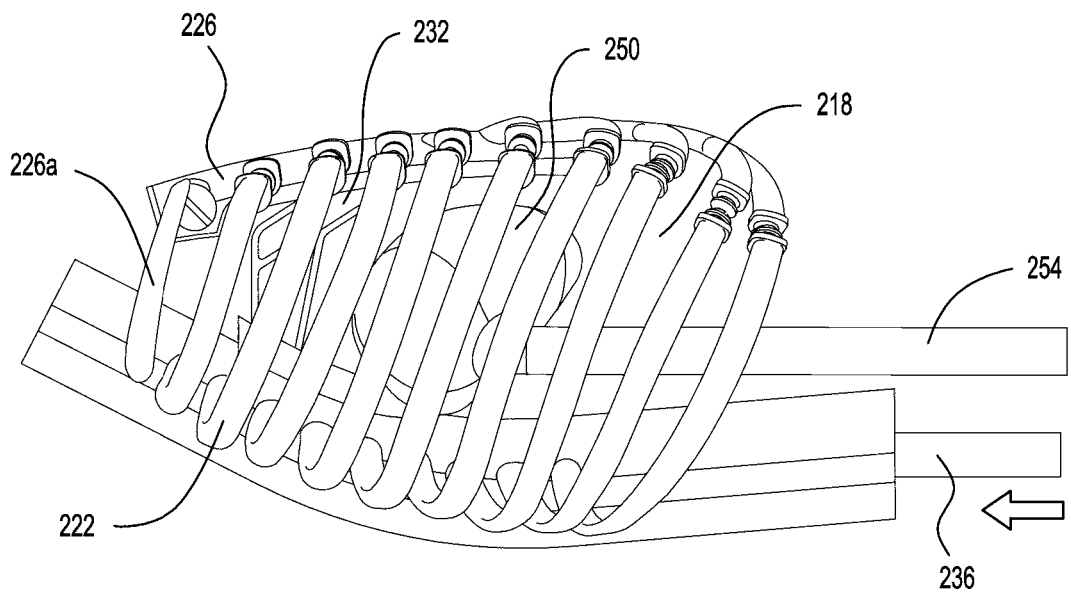
Figure 22A:
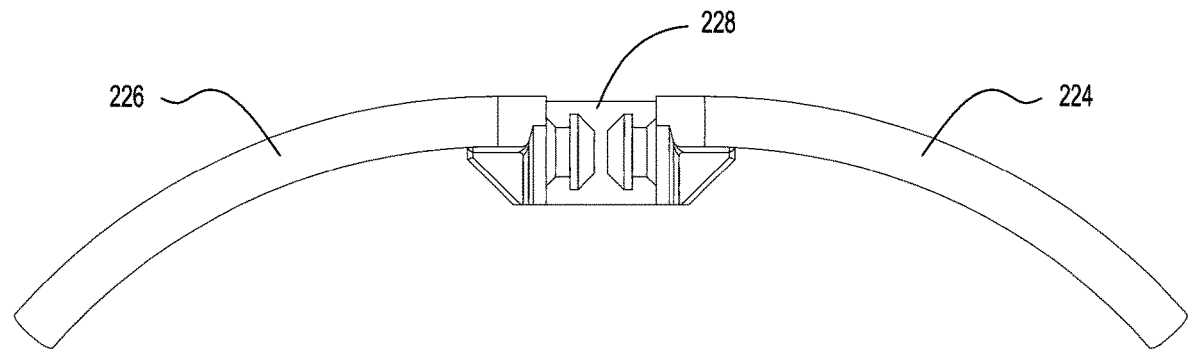
FIG. 22a is a side view of a non-rigid connector between a rib and the breastbone.
Figure 22B:
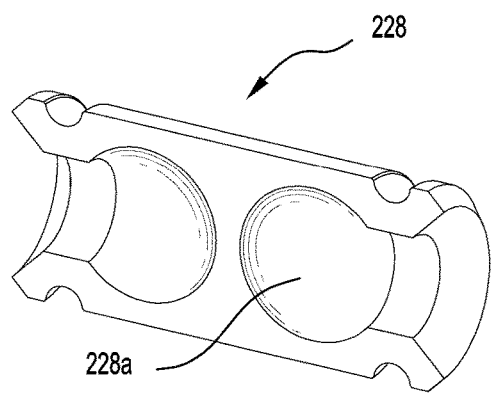

The articulating linkage 230 has an arm 232 that is that is pivotally connected to the breastbone 226 (see FIG. 17b). The arm 232 is also pivotally connected to the spine 217. The arm is substantially 'L' shaped. The articulating linkage 230 has a connecting member 234 that is pivotally connected at one end of the arm 232 and at the other end is pivotally connected to a shaft 236 that extends through the spine 217 of the phantom 200. The shaft 236 can reciprocate longitudinally, and is moved by a motor 238. The spine 217 and the motor 238 are attached to a board 270. The board 270 provides a convenient surface to mount componentry for the phantom 200.

Referring to FIGS. 17a and 17b, when the shaft 236 is in a retracted position the chest wall 220 is in an expiration position (FIG. 17a). When the motor 238 extends the shaft 236 longitudinally the connecting member 234 causes the arm 232 to rotate relative to the spine 217. As the arm 232 rotates the breastbone 226 is moved superior (up) and anterior (forward), causing the chest wall to expand (FIG. 17b). In other words, when the shaft 236 is extended the arm 232 pivots relative to the back 216 of the phantom 200 to move the chest wall 220 away from the back 216 of the phantom 200. The linear movement of the chest wall in two spatial directions, superior and anterior, create non-linear motion. As the breastbone 226 moves superior and anterior the ribs 222, 224, which are attached via elastomeric hinges 228, are pulled superior and anterior by the movement of the breastbone 226 and pivot relative to the spine 217. The elastomeric hinge allows the ribs 222, 224 and the breastbone 226 to twist relative to each other, while ensuring that they remain connected.

The heart 250 is supported within the internal cavity 218 by a rigid arm 254. When the motor 252 retracts the rigid arm 254 the heart moves inferior (down). The heart 250 may also have a diaphragm 256 attached to the heart 250 to loosely mimic the movement of a human diaphragm. This is a simplified model of the movement experienced by the heart and diaphragm that is only appropriate for modelling DIBH. It is envisaged that the diaphragm could be controlled by a separate motion mechanism to allow the movement of the diaphragm and the movement of the heart to be different. The motor 252 is synchronised with the motor 238 to substantially represent the movement of inhalation and exhalation in a human body. The movement of the heart 250 by the motor 252 is not intended to replicate the beating of the heart, but rather the movement of the heart caused by the inflation of the lungs during inhalation.

Figure 24:
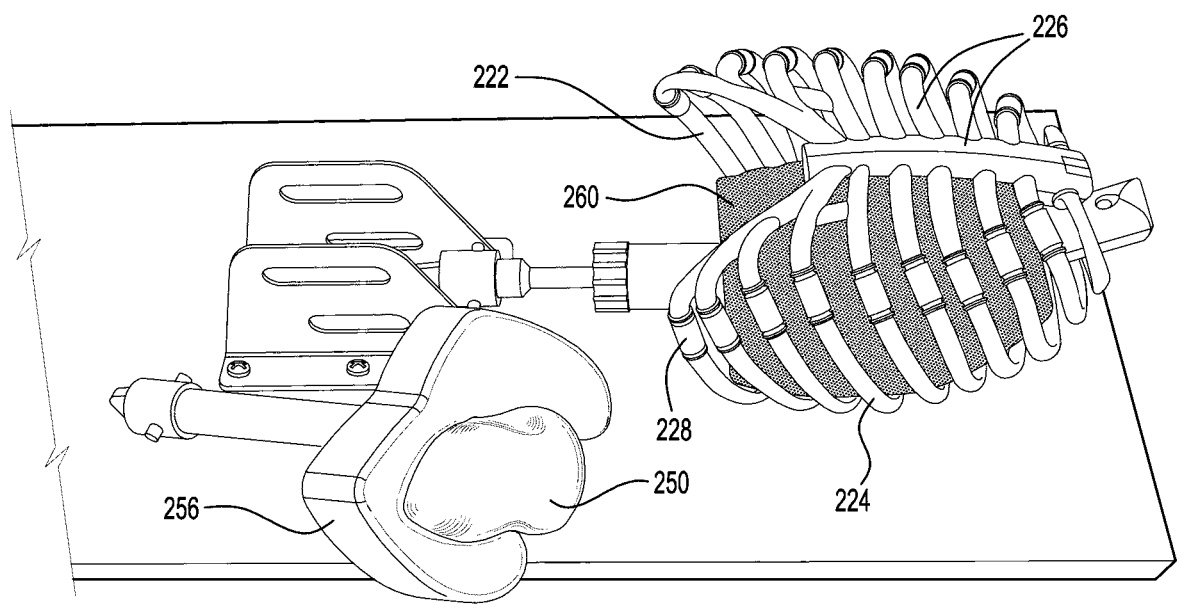
FIG. 24 is an upper perspective view of the phantom in FIG. 14, with a separated lung attachment.
Figure 25:
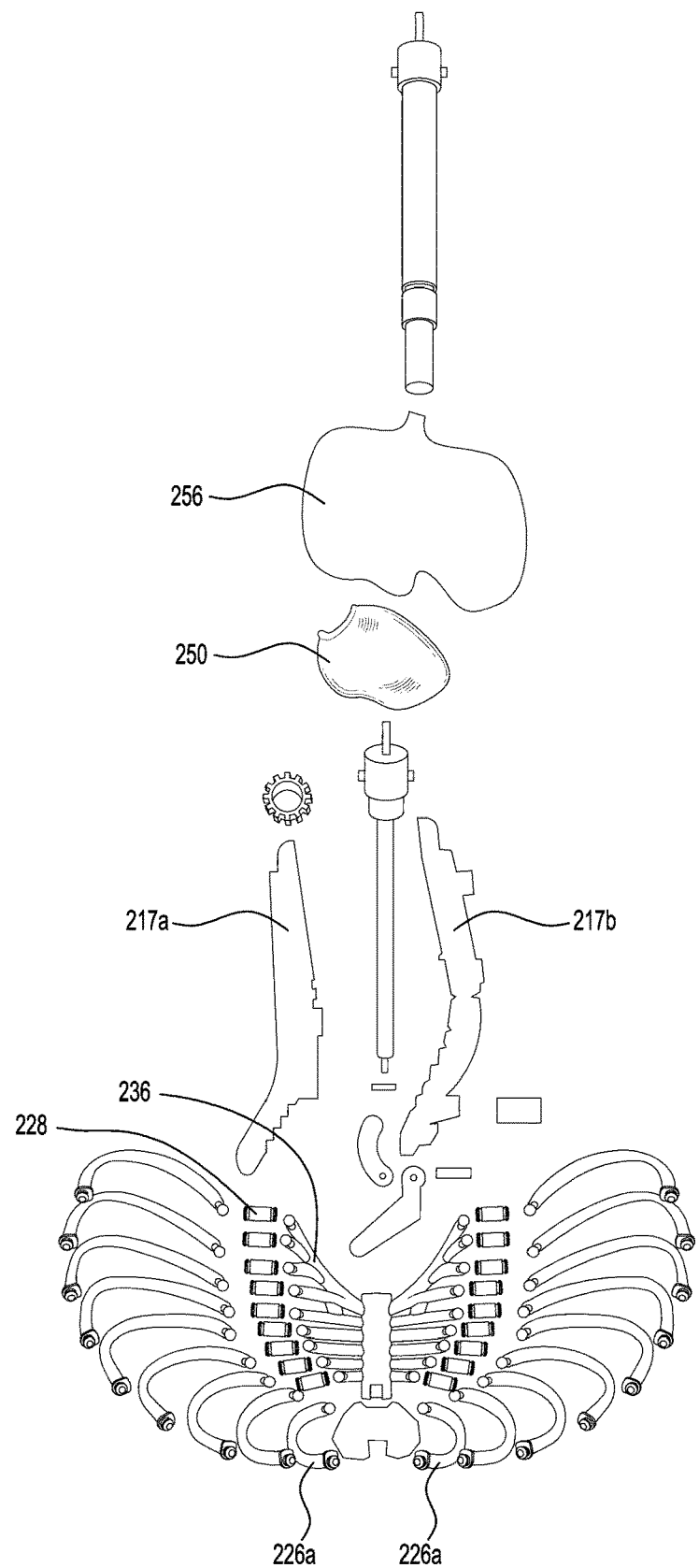
FIG. 25 is an exploded view of the phantom shown in FIG. 14.

The phantom 200 also has lungs 260 made from foam sponge (FIG. 24). The lungs 260 are passive and move in reaction to the movement of the chest wall 220, the heart 250 and the diaphragm 256. In order to more closely match the desirable density of the lungs, a lung analogue made from a combination of natural sponge and water can be used to mimic the lungs characteristics. In order to avoid water leaking the foam can be manufactured in small semi-circular tubes 262 with a water-tight outer surface, which extend lengthwise of the phantom, that entirely enclose sections of wetted foam 264 (see FIG. 11B). The semi-circular tubes 262 are then connected, for example by glue, so that they move as a single piece (see FIG. 11C). Finally, a water tight skin 266 is applied to the connected semi-circular tubes 262 (see FIG. 11D). By manufacturing the lungs in this way the water will remain "uniformly distributed" in the foam. Alternatively, Styrofoam beads and water could be used to mimic the lung.

While the first and second motion mechanisms have been described as motors 238, 252, it will be understood that the motion mechanisms could be any suitable linear actuator. For example the motion mechanisms could be any suitable electro-mechanical mechanism or any suitable electro-pneumatic or electro-hydraulic mechanism.

While two different variations of the phantom 10, 200 have been described above, it is envisaged that functional components of one phantom could be combined with functional components of the other phantom. For example, while phantom 200 describes a heart 250 attached to a rigid arm 254, phantom 200 could instead utilise the heart 50 described in relation to the phantom 10. In addition, while the phantom 200 has been described with passive lungs 260, it is envisaged that the phantom 200 could include the lungs 60 described in relation to the phantom 10.

Figure 8:
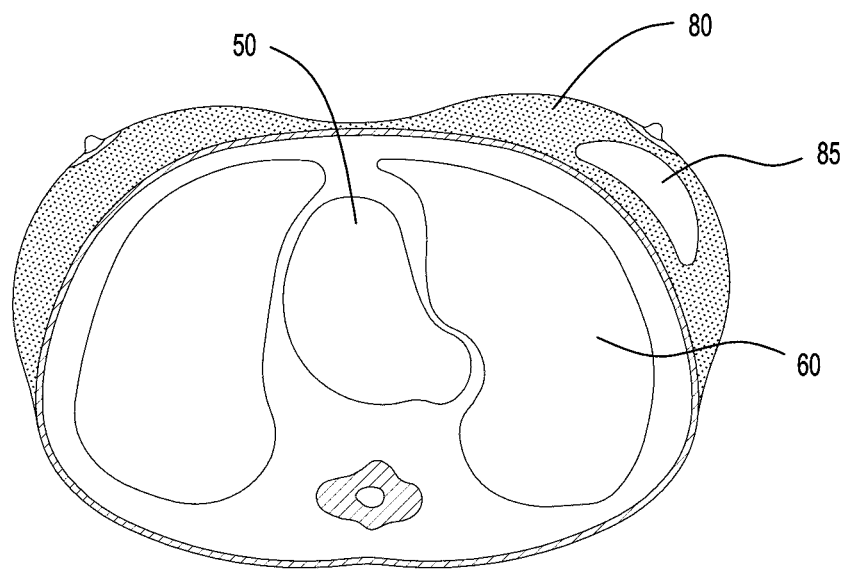
FIG. 8 is a bottom view of the phantom in FIG. 4A.
Figure 9:
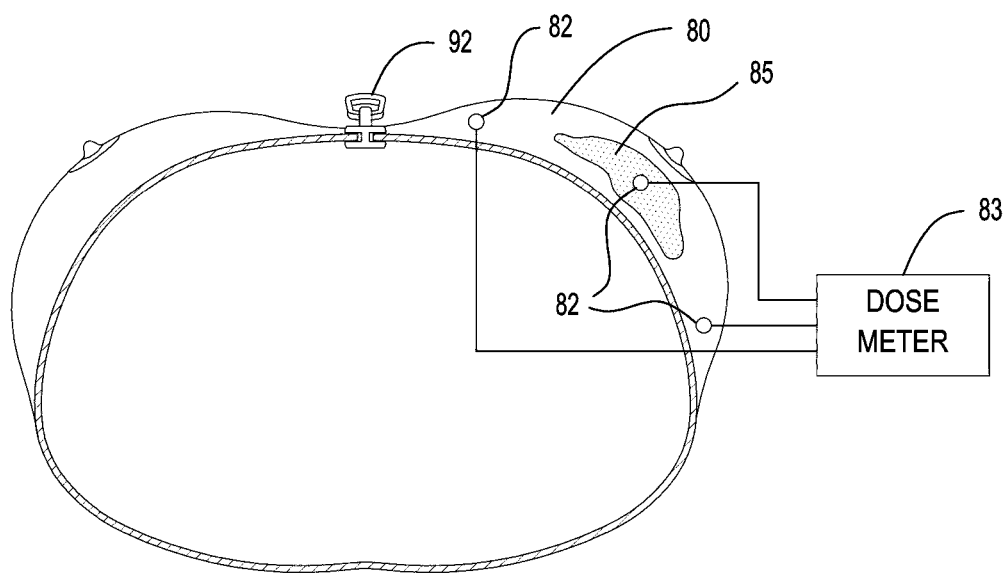
FIG. 9 is a bottom view of a phantom in FIG. 1.

The following features will be described in relation to the phantom 10, however they are equally applicable to the phantom 200. As illustrated in FIGS. 8 and 9, the phantom 10 may also include a cancer lesion 85. In the example of female breast cancer, the cancer lesion 85 will be located in the breast 80. The cancer lesion 85 may be designed in a similar shape and size as that of cancer lesions commonly found in the female breast. It will be understood that the cancer lesion 85 has a different density to that of the rest of breast 80. Consequently, the cancer lesion 85 can be clearly identified and therefore delineated on the CT images of the phantom 10. Furthermore, the cancer lesion 85 is designed so that it may be replaced with a specifically formulated and manufactured gel that can be used as a radiation dose detector. The gel can be formed to the same shape and size of cancer lesion 85. It will be understood that the above described gel dose detector has similar properties to those of the breast 80. Alternatively, in the case of lung cancer, the cancer lesion 85 would be located in one of the pair of lungs 60, preferably near the lower bottom of the lung 61. The cancer lesion in the lung 60 may be designed in a ball-shape of 2 to 3 cm in diameter, and will ideally be made from a material with properties that resemble that of a cancer lesion, for example, Dermasol (commercially available product with a density of 0.82 g/cm$^3$). It will be understood that in the case of breast cancer it would be possible to only include one breast on the body 12 of the phantom 10, however it is desirable to have both breasts present, especially when using an IR camera to detect chest wall movement. The surfaces of the breast 80 and the rest of the chest 20 may have similar properties as those of human skin with respect to the images acquired by the infrared camera. It will also be understood that when the purpose of using the phantom 10 is to investigate the lungs 60, then both a male and a female version could be created (e.g. with or without breasts 80). It would be preferable that the female model of phantom 10 would represent the physical dimensions of the average woman and the male model of the phantom 10 would represent the physical dimensions of the average person. Alternatively, the phantom could be designed to replicate a specific demographic, e.g. children, or even a specific person.

The organs and other body parts of the phantom 10 will ideally represent the densities of these parts in a human. In particular, the density of organs in g/cm$^3$ should be approximately 1.05 for the heart, 0.95 for breast and soft tissue, 0.25 to 0.45 for the lungs, and 1.3 to 1.8 for the ribs/bones. For example, the heart could be made from silicone gel, polyurethane or rubber, and the skin could be made from ballistics gel (pig gelatine) or silicone. It will be possible to cast the skin and breasts so that they have the flexibility, feel, elasticity, density and colour of a human, and then secure the moulded skin and breasts to the rib cage by Velcro or a zip. The breasts may be made from, for example, commercial breast implants, PlatSilR Gel-10 (platinum silicone), or Zerdine self-healing material. Alternatively, the breasts and skin can be casted as one completed piece then attached or "pulled-on" like T-shirt, to the rib cage of the phantom 10.

The organs and other body parts of the phantom 10 can be fabricated or produced using the available, relatively new and advanced three-dimensional printing technologies, to achieve their closer similarities to those of human, in terms of shape and size of both outer surface and internal structure, using desirable materials and suitable techniques.

The cancer lesion 85 in breast will have a slightly different density than normal breast tissue, which allows it to be detected during CT scans. The density of the cancer lesion 85 will preferably be approximately of 1.02 g/cm3. For example, the cancer lesion 85 may be made from Dermasol. Preferably, the materials used in the phantom will have similar physical densities and a similar density to the corresponding human body parts.

Figure 10:
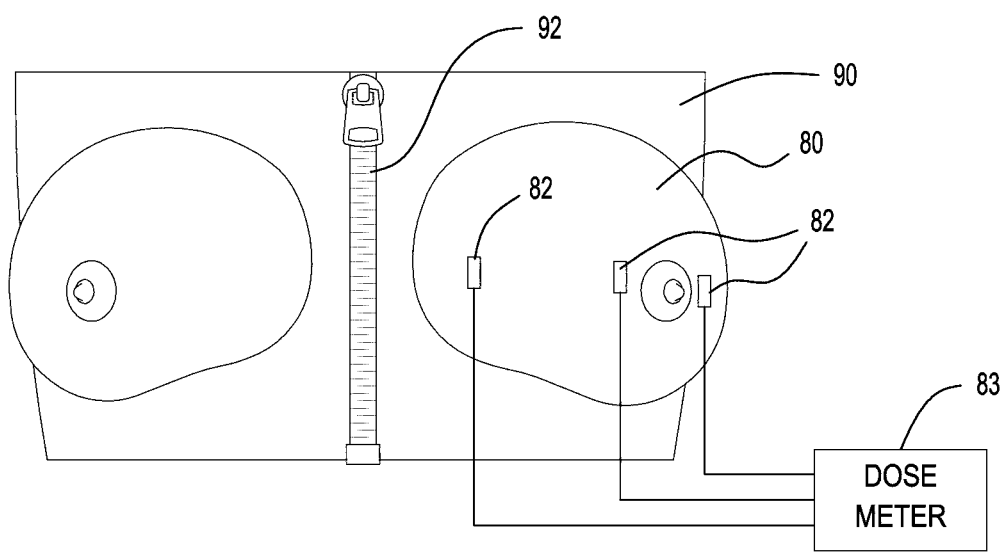
FIG. 10 is a front view of a phantom in FIG. 9.

The phantom 10 may have one or more devices for detecting and/or measuring radiation dose. FIG. 10 illustrates silicone based semiconductor diode radiation detectors 82 embedded in the left breast of the pair of breasts 80 of the phantom 10. The diode radiation detectors 82 are connected to a dose meter 83 that records the radiation dose delivered to the diodes 82. It will be understood that the diodes could be placed in one or more of the body parts of the phantom 10. For example, the diode radiation detectors 82 could be embedded in the breast 80, lung 60 and heart 50 of the phantom 10. In addition, a diode radiation detector 82 could be embedded in the cancer lesion 85. The diode radiation detectors should be placed in areas in which knowledge of the dose of radiation delivered is required.

By including diode radiation detectors 82 in the phantom 10 it is possible to monitor and determine the radiation dose delivered during a radiation treatment to various parts of the body 12. This allows the user of the phantom 10 to determine what dose is given to the cancer lesion 85 and to region of interest (ROI) in the heart 50 and the lungs 60, and in the case of a female phantom, the pair of breasts 80. From this data it is possible to determine the effectiveness of a treatment plan. It will be understood that the diode radiation detectors 82 could be in forms of any suitable size and in any specific type, for example, photon diodes, electron diodes or metal-oxide-semiconductor field-effect transistors (MOSFET) that are commercially available.

Alternatively, the one or more devices for detecting and/or measuring radiation dose could be ion chambers. For example, the heart 50 could have an ion chamber holding tube imbedded into it, the ion chamber then placed inside the ion chamber holder. In general, diode radiation detectors are preferable as they have a smaller volume than ionisation chambers, and diodes are made out of material that is tissue equivalent. It will be understood that the diode radiation detectors 82 may be replaced with other type of detectors, for examples, diamond detectors, thermo-luminescent dosimeters (TLD), optically stimulated luminescence (OSL) detectors, radiochromic films or specially formulated dose-measuring capable gels.

Figure 11A:
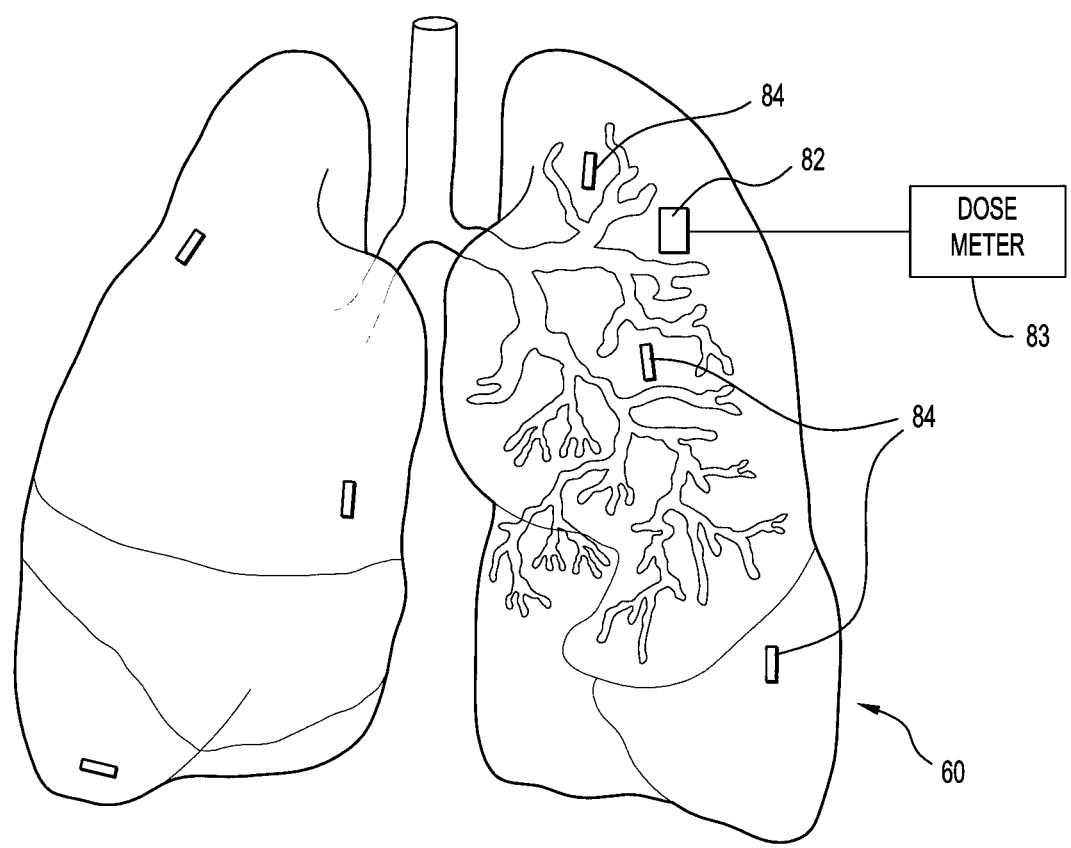
FIG. 11A is a schematic of a movable organ member with implanted radiation detectors.
Figure 11B:
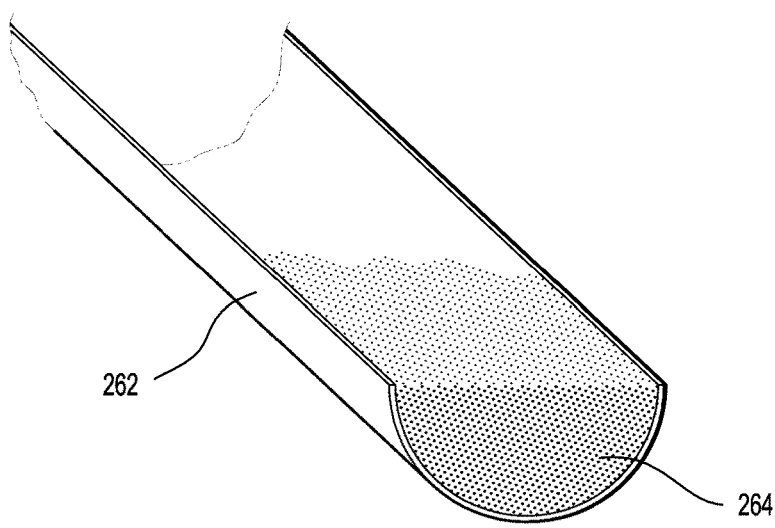
FIGS. 11B to 11D are schematics of a lung analogue.
Figure 11C:
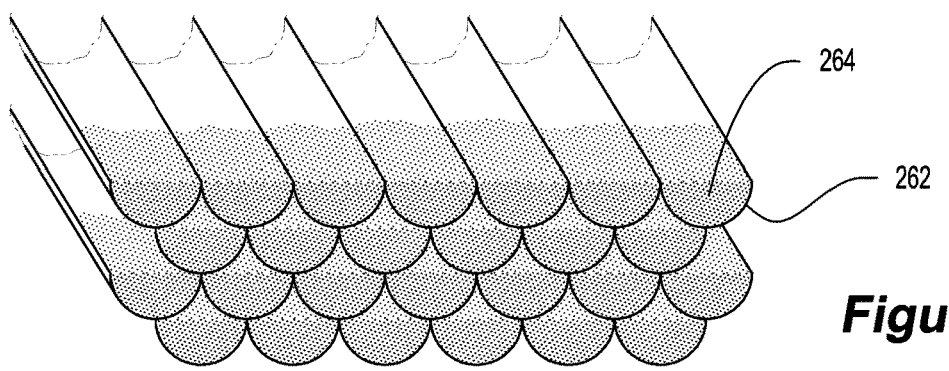
Figure 11D:
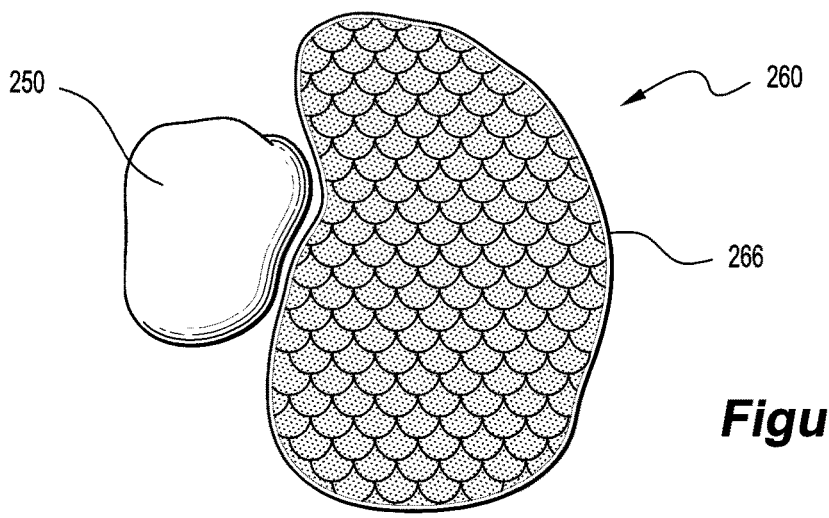

The phantom 10 may also have markers implanted to enable tracking of the body parts. The markers may be, for example, commercial fiducial markers, gold wire (~10 mm) or copper wire (~10 mm). FIG. 11A illustrates gold fiducial markers implanted in the lungs 60. The fiducial markers can be implanted anywhere on the lungs 60, however they preferably located in regions of interest that will help to determine the motion and position of the lungs 60 during respiration. For example, gold fiducial markers can be implanted in the upper, middle, lower, central and outer regions of the lungs 60. The fiducial markers 84 may have dimensions of approximately 0.75 mm in diameter and 10 mm in length. The gold fiducial markers 84 can be used as an identifier of tumour mass in both x-rays and CT images. The markers 84 can also be used to measure the respiratory motion locus at the corresponding points by using a four-dimensional CT (4DCT), or four-dimensional cone beam CT (4D-CBCT) or other means, enabling the hysteresis effect to be visualised and measured. It will be understood that the markers 84 could be implanted within the cancer lesion 85. It will be understood that the fiducial markers 84 may be replaced by markers of other type or shape, for example, golden coils or wires that are available for clinical use. In addition, specifically designed ceramic markers for nuclear magnetic resonance imaging (MRI) can also replace markers 84.

The phantom 10 may also include humanlike skin, in texture (smoothness), colour, and of the reflective characteristics received by both optical and infrared cameras. For example, the phantom 10 may have fair, medium or dark skin. The advantage of providing humanlike skin on the phantom 10 is that it enables imaging by optical and/or infrared cameras, which are used for detecting the motion of the chest 20, and the breasts 80 in the case of a female phantom 10, to visualise an object that is similar to a person. Using a phantom that does not include humanlike skin may result in cameras that have been designed specifically to image human skin no longer accurately measuring the position of the chest, due to the reflectivity, smoothness or shininess etc. of the skin not mimicking that of a human. The humanlike skin may either be applied to outer surface of the phantom 10, or may be implemented by using a separate top layer that covers the outer surface of the chest 20. By having a separate top layer the skin can be easily changed to mimic different ethnic groups.

The phantom 10 may be provided with a means for allowing easier access to the internal cavity 18. For example, the chest wall 20 may be provided with a zipper 92 made of plastics in the centre of the chest that runs superior to inferior along the phantom 10. The zipper 92 allows easier access to enable, among other things, accurate placement of radiation detectors. For example, if different type of radiation detector was desired to be used, such as replacing a MOSFET detector with a diode detector, the zipper would make it easier to do so. In addition, if the radiation detectors are to be placed at various inner locations, and potentially repositioned to different locations on the surface of the heart 50 and the lung 60, the internal cavity 18 is more easily accessed by the zipper 92, to allow accurate placement of the detectors.

The phantom 10 can be used in a large range of applications. For example, the phantom 10 could potentially be used for:
- commissioning CT/4DCT systems for DIBH or SBRT;
- commissioning radiotherapy treatment planning systems (RTPS) for DIBH or SBRT;
- commissioning medical linear accelerators (LINAC) with an on-board x-ray imager (OBI) and CBCT/4D-CBCT for DIBH or SBRT or other techniques;
- commissioning medical linear accelerators (LINAC) with multi-leaf collimator (MLC) tracking capability, or tumour-tracking capability, beam gating or image-gating capabilities for DIBH or SBRT or other radiotherapy techniques;
- commissioning in-room optical/infrared camera systems for DIBH or SBRT;
- examining the motion detection consistency between different imaging modalities or systems, for example, CT to MRI/PET, 4DCT to 4D-CBCT, 4DCT to IR.
- regular QA and periodic testing of above systems;
- education of students or trainees to demonstrate chest motion during respiration and for demonstration of DIBH and SBRT techniques;
- research activities associated with breast and lung cancers;
- training and to be used for practicing fiducial marker insertion procedures by clinicians;
- regular, patient-specific QA for DIBH or SBRT or other treatments.

As the phantom 10 is capable of mimicking movement of the human chest, heart, lungs etc., it is understood that such an apparatus could readily be substituted for a human subject when teaching students or trainees about the movements of several organs during the respiration cycle. In addition, it is understood that the phantom 10 could be widely used in research activities into human lung and breast cancers, as it is capable of mimicking the movement of these organs during the respiration cycle. For example, the phantom 10 could be used to test various new treatment methods for cancers in different locations in order to determine the best ratio of dose to the tumour compared to dose to healthy tissue.

It will be understood that the phantom 10 is designed to be reusable, and therefore, in general, the components of the phantom 10 will also be reusable and be replaceable should that component be damaged. For example, the lungs 60 may be made from materials that allow the lungs 60 to be used multiple times. However, it will be understood that using non-reusable lungs, such as living tissue human or animal lungs, if permitted, would not deviate from the current invention. In general, the movements of the phantom 10 will preferably replicate the movements of a human, both temporally and spatially.

Examples are provided below in which the use of the phantom 10 is described.

Example 1—Commissioning of Radiation Delivery Machines for Treating Breast Cancer Using DIBH Commissioning an electro-mechanical, radiation emitting machine, e.g. LINAC or CT requires a physicist to verify that the geometry, the energy, the spatial and temporal precision and the integral dose of emitting radiation beams intended to be delivered by the radiation delivery machine will be delivered as intended (i.e. as planned), and/or the images generated by the radiation beam(s) are of high quality and will be the true representatives of human body scanned.

In the DIBH treatment process, patients have to undergo CT imaging and treatment simulation, in which the patient is required to be scanned with CT on her thorax region for deep-inhalation breath-hold states. The CT scanner is equipped with cameras (IR and video) to monitor the respiratory movement of chest surface.

During commissioning the patient will be replaced with the phantom 10. As illustrated in FIG. 12, and discussed above, the stepper motor 32A may be located outside of the internal cavity 18. As a result of the stepper motor 32A being located outside of the internal cavity 18 the stepper motor will not interfere with the CT imaging. CT scans of the phantom 10 should produce a series of cross sectional images from which the bone structure of the ribs 20 (in the embodiments with the ribs), the heart 50 and the lung 60, the cancer lesion 85 and the fiducial markers 84 etc. will be visually identified. From these images, the position or size, and the relative distance between ROIs can be measured as a function of time in the respiration cycle. The images should be able to produce a set of digitally reconstructed radiographs (DRRs) that enable the physicist to study the above-mentioned organs/ROIs from more desirable perspective angles. It is important that the CT datasets are accurate as they are used to plan the treatment.

Planning involves a patient's CT datasets being sent to radiotherapy treatment planning (RTP) computer for delineations of tumour(s) and other organs at risk (OAR) before beams of ideal shape and size are placed at optimal angles, and finally doses are calculated. During commissioning the CT images from the patient will be replaced with the CT images from the phantom 10, and a treatment plan will be developed and radiation doses calculated.

The phantom 10 can then be used to determine if the planned treatment it actually delivered to the areas or points as calculated during planning. In other words, the phantom 10 can be used to determine if the radiation is being delivered by the machine agrees with the planned treatment, or whether the machine is not working as intended.

For commissioning radiation delivery machine (LINAC) to treat breast cancer using DIBH the phantom 10 should include the breasts 80, the tumour 85 and the heart 50, but does not necessarily need to include the lungs 60. This is because DIBH technique for breast cancer moves the heart posterior and inferior during deep inhalation, moving the heart further away from the site of the cancer. It is the separation of the heart relative to the breast that is sought, rather than the movement of the lungs. However, the inflation of lungs during DIBH will affect the calculation of the dose-volume-histogram (DVH) of the lung immediately underneath the cancerous breast. Therefore, it is desirable to have the lung 60 present in the phantom 10. Again, the stepper motor that controls the movement of the heart 50 will be located outside of the internal cavity 18 of the phantom 10.

The breasts 80, heart 50 and cancer 85 should all have radiation detectors 82 to allow for instant radiation measurements of these regions to be recorded. Each of the breasts 80, heart 50 and cancer 85 may have one or more radiation detectors 82. By increasing the number of radiation detectors the amount of dose and the locations of dose point can be more accurately determined.

As the DIBH technique also reduces the radiation dose to the lungs, it is desirable to include a pair of lungs 60 in the phantom 10, equipped with a number of diode radiation detectors 82, in order to determine and compare the radiation doses that are delivered to the lungs.

In use, the phantom 10 will be positioned on the machine and will receive the nominal dose calculated by the treatment plan. The measurements of the diode radiation detectors 82, which are recorded by the dose meter 83, are then compared to the dose that was intended to be delivered by the treatment plan. If the dose delivered to the phantom 10 and the dose calculated by the treatment plan match well then is known that the radiation delivery is executed properly. There are several factors that could lead to the radiation delivered not being accurate. For example, dose non-linearity when the beam is switched between on-and-off; systematic temporal mismatch between beam-on moments and/or the synchronisation with patient's breathing cycle being out; possible spatial positioning offset between the planned and delivered targets. In any of the above examples, the inaccuracy or error will result in either the cancer target being under-treated or the near-by healthy tissue/organ, for example, the lung or heart, being exposed unwontedly. While using the phantom 10 will not identify the cause of the dose being delivered incorrectly, it will notify the physicist that a problem exists, prompting the physicist to further investigate and avoiding patients being incorrectly treated and exposed to unintended radiation dosage.

A similar method and phantom 10 would be used for commissioning machines for gated free breathing treatment of breast cancer, with the exception that the initial CT imaging and treatment simulation would be carried out under on the phantom 10 for free breathing respiration.

A similar method would also be used to conduct regular QA and periodic testing.

Example 2—Commissioning of Radiation Delivery, Treatment Planning and Imaging Machines for Treating Lung Cancer The steps involved in commissioning a machine for treating lung cancer are similar to the step outlined in Example 1. Again, the phantom 10 will undergo CT imaging and treatment simulation, in which the phantom 10 is required to be scanned with CT on the phantoms thorax region for either free breathing and/or possible breath-hold states.

During the free/regular breathing respiration, the cancer lesion in the lung is moving continuously. Often the cancer lesion is small and has low contrast to the surrounding healthy tissue, and hence will be difficult to identify on the x-ray image generated by the treatment machine, but the cancerous volume can be seen more easily on CT images. Consequently, fiducial marker is required and will be implanted into tumour when undergoing CT scan. Due to the complexity at various positions in a breathing lung, the motion locus of the fiducial marker can be an irregular three-dimensional loop during the inhalation and exhalation, known as Hysteresis effect. Therefore, it is important that the fiducial marker indicating the cancer target can be located and tracked accurately.

For commissioning a CT scanner that is capable of 4DCT imaging, the phantom 10 should include the lungs 60, the cancer lesion 85 and the fiducial marker 84. The fiducial marker 84 can be used to accurately measure the movements of cancer lesion 85 during the respiration cycle on both CT and x-ray images. From the 4DCT data, a Hysteresis loop can be generated of fiducial marker 84, and this loop can be used for treatment planning. The agreement between 4DCT and x-ray measurements of fiducial marker 84 of phantom 10 will determine the accuracy of the 4DCT imaging.

For commissioning a radiation treatment planning (RTP) computer system that is capable of CT to CT image fusion, MRI to CT fusion, deformable image registrations between CT and other imaging modalities, the phantom 10 should include the lungs 60, heart 50, the cancer lesion 85 and the fiducial marker 84. The lungs 60, heart 50 and fiducial marker 84 can be used to accurately measure the registration agreements between any two sets of images, to study the deformations of lung 60, heart 50 and the cancer lesion 85 at any stage during a free breathing cycle. Thereby using phantom 10, the accuracies of RTP system of imaging co-registration, organ location and volume calculation can be determined.

For commissioning a radiation delivery machine for treatment of lung cancer using a free breathing or DIBH technique, the phantom 10 should include the tumour 85 and the pair of lungs 60 and fiducial marker(s) 84 inside the tumour 85, but does not necessarily need to include the heart 50. The fiducial marker 84 will be used to identify the tumour 85 on x-ray image. The phantom 10 is suitable for both male and female, and the inclusion of the breasts 80 will be based on whether a male of female version is desired. Again, the stepper motor that controls the movement of the lungs will be located outside of the internal cavity 18 of the phantom 10. The air pump 72 of the ventilator 70 is also located outside of the internal cavity 18. Alternatively, the lungs 60 and the cancer lesion 85 can have diode radiation detectors 82 replacing fiducial marker 84 to allow for radiation dose measurements of any region of interest to be recorded. Each the lungs 60 and cancer lesion 85 may have one or more detectors 82. By increasing the number of radiation detectors the amount and location of dose points can be more accurately determined.

As the heart is an organ that should not be delivered dose, it is possible to include the heart 50 in the phantom 10, equipped with diode radiation detectors 82, in order to also monitor and determine the radiation dose that is delivered to the heart.

As in Example 1, the phantom 10 will be positioned on the machine and will receive the dose as calculated by the treatment plan. The measurements of dose by the diode radiation detectors 82, which are recorded by the dose meter 83, are then compared to the dose that was intended to be delivered by the treatment plan. If the dose delivered to the phantom 10 and the dose calculated by the treatment plan match then is known that the radiation delivery machine is functioning properly.

A similar method would be used to conduct regular QA and periodic testing.

Example 3—Fiducial Marker Insertion

Fiducial marker insertion procedures are risky of non-satisfactory clinical results and are considered a difficult task that is often only practised in vivo by clinicians due to the lack of appropriate in vitro models. The phantom 10 may be used for practicing fiducial marker insertion procedures by clinicians.

For practicing fiducial marker insertion procedures, the phantom 10 should include the pair of lungs 60 and cancer lesion 85, but does not necessarily need to include the heart 50. The phantom 10 is suitable for both male and female, and the inclusion of the breasts 80 will be based on whether a male of female version is desired. As fiducial marker placement does not require the measurement of radiation dose, the lungs 60 do not need to have diode radiation detectors 82, and the stepper motors may be placed anywhere.

As clinicians are likely to want to practice fiducial marker placement on a phantom that is realistic, it is possible to include the heart 50 in the phantom 10.

During fiducial marker placement the patient is CT scanned to generate the first set of CT images. The ideal destination in tumour volume and the travel path of fiducial marker are planned on these images while the patient is lying on the CT couch. The clinician punctures the skin and lung peripherally with a set of needles of different diameters and lengths to implant a marker inside the moving tumour volume. Then a re-scan of patient is performed immediately to generate the second set of images to verify the marker placement result. The difficulty faced by clinicians is the movement of both the chest and the lungs as this procedure is being conducted. This procedure is most likely performed in a limited space in clinical environment, for example, in the gap of 15 cm long between the patient and the CT gantry of 80 cm in diameter. Having a phantom in which the chest wall and lungs move in a way that mimics the movement of a human allows the clinicians to practice the techniques more frequently and more freely in similar circumstances to in vivo or even in non-clinical environment, for example, in office or classroom to enhance their skills.

Once the clinician has finished placement of the fiducial markers 84 in the lung lesion 85 the phantom 10 can be scanned with 4DCT and the marker 84 placement analysed to assess how well the markers 84 were placed, allowing the clinician to continuing practicing until they develop the ability to accurately place the fiducial markers inside patients.

The invention claimed is:

1. A dynamic phantom, the dynamic phantom comprising:
a body having a front, a back, and an internal cavity between the front and the back, the body having a movable chest wall comprising a first segment, a second segment and a third segment, the third segment connecting the first segment to the second segment;
an electromechanical first motion mechanism attached to the first and second segments of the chest wall at a plurality of points, the first motion mechanism having a driving member that acts on the movable chest wall to move the movable chest wall to thereby move the front relative to the back of the body;
a moveable organ member supported within the internal cavity that is caused to move relative to the body by a second motion mechanism, the movable organ member having a first end that is fixed relative to the back of the body and a second end that is biased towards a first position; and
first and second drive sources to independently drive the electromechanical first motion mechanism and second motion mechanism, respectively;
wherein the first drive source drives the first motion mechanism to move the front of the body relative to the back of the body and the second drive source drives the second motion mechanism to stretch the moveable organ member to move the second end of the moveable organ member relative to the first end of the moveable organ member to substantially represent respiration movement of the movable chest wall and the moveable organ member in a human body.

2. The dynamic phantom of claim 1, wherein the movable chest wall moves in more than one spatial direction.

3. The dynamic phantom of claim 1, wherein the electromechanical first motion mechanism comprises a linkage arrangement, the driving member being part of the linkage arrangement.

4. The dynamic phantom of claim 1, wherein the electromechanical first motion mechanism or second motion mechanism comprises reciprocating, pivoting, cammed or sliding movements.

5. The dynamic phantom of claim 1, wherein the driving member is connected to the third segment.

6. The dynamic phantom of claim 1, wherein the driving member is an arm pivotally connected to both the third segment and the back of the dynamic phantom.

7. The dynamic phantom of claim 6, wherein the electromechanical first motion mechanism further comprises a reciprocating shaft, the reciprocating shaft being pivotally connected to the arm.

8. The dynamic phantom of any one of claim 1, wherein the third segment is flexibly connected to the first segment and the second segment.

9. The dynamic phantom of any one of claim 1, wherein the first segment and the second segment are connected to the back of the dynamic phantom.

10. The dynamic phantom of any one of claim 1, wherein the first segment and the second segment move relative to each other when the electromechanical first motion mechanism moves the movable chest wall.

11. The dynamic phantom of claim 1, wherein the movable chest wall is resilient and deforms when the electromechanical first motion mechanism moves the movable chest wall.

12. The dynamic phantom of claim 1, wherein the movable chest wall is biased towards an exhalation position and the electromechanical first motion mechanism moves the movable chest wall to an inhalation position.

13. The dynamic phantom of claim 1, wherein the moveable organ member is deformable.

14. The dynamic phantom of claim 1, wherein the electromechanical first motion mechanism expands the movable chest wall.

15. The dynamic phantom of claim 1, wherein each of the electromechanical first motion mechanism and second motion mechanism substantially represent movement of both inhalation and exhalation in a human body.

16. The dynamic phantom of claim 1, wherein the electromechanical first motion mechanism and second motion mechanism are synchronized.

* * * * *